United States Patent
Guey et al.

(10) Patent No.: US 8,554,235 B2
(45) Date of Patent: Oct. 8, 2013

(54) DISTRIBUTED SCHEDULING COORDINATION FOR PLURAL SERVICE AREAS

(75) Inventors: Jiann-Ching Guey, Fremont, CA (US); Havish Koorapaty, Saratoga, CA (US)

(73) Assignee: Telefonaktiebolaget L M Ericcson (publ), Stockholm (SE)

( * ) Notice: Subject to any disclaimer, the term of this patent is extended or adjusted under 35 U.S.C. 154(b) by 231 days.

(21) Appl. No.: 12/944,204

(22) Filed: Nov. 11, 2010

(65) Prior Publication Data
US 2012/0122462 A1    May 17, 2012

(51) Int. Cl.
*H04W 40/00*    (2009.01)
*H04W 72/00*    (2009.01)

(52) U.S. Cl.
USPC .......................... 455/447; 455/450; 455/452.1

(58) Field of Classification Search
USPC .................. 455/446–453; 370/329–330, 341
See application file for complete search history.

(56) References Cited

U.S. PATENT DOCUMENTS

| | | | |
|---|---|---|---|
| 8,320,924 B2 * | 11/2012 | Kashima et al. | 455/450 |
| 2008/0212539 A1 | 9/2008 | Bottomley et al. | |
| 2010/0261482 A1 | 10/2010 | Guey | |
| 2010/0261493 A1 | 10/2010 | Guey et al. | |
| 2010/0323712 A1 | 12/2010 | Guey et al. | |
| 2011/0280205 A1 * | 11/2011 | Qin et al. | 370/329 |

FOREIGN PATENT DOCUMENTS

| WO | WO 2010/075781 | * | 7/2010 |
|---|---|---|---|
| WO | WO 2010105878 A1 | * | 9/2010 |

* cited by examiner

*Primary Examiner* — George Eng
*Assistant Examiner* — Nam Huynh
(74) *Attorney, Agent, or Firm* — Nixon & Vanderhye, P.C.

(57) ABSTRACT

An apparatus (20) is associated with a telecommunications node (N) which serves a service area (S) which belongs to one set of plural sets of service areas comprising a network. The apparatus (20) divides a time resource for the node into plural phases in coordinated manner with other service areas. The apparatus (20) further generates a schedule for transmission/reception of user traffic for wireless terminals served by the node for plural consecutive phases. The schedule is generated so that during the plural consecutive phases the node can transmit and receive scheduled user traffic before receiving in the plural consecutive phases scheduling information from another node which serves another set of service areas.

29 Claims, 18 Drawing Sheets

SET 0   SET 1   SET 2

DISTRIBUTED SCHEDULING COORDINATION FOR PLURAL SERVICE AREAS

TECHNICAL FIELD

This invention pertains to telecommunications, and particularly to the scheduling of transmission/reception activities in a radio access network.

BACKGROUND

In a typical cellular radio system, wireless terminals (also known as mobile stations and/or user equipment units (UEs)) communicate via a radio access network (RAN) to one or more core networks. The radio access network (RAN) covers a geographical area which is divided into cell areas, with each cell area being served by a base station, e.g., a radio base station (RBS), which in some networks may also be called, for example, a "NodeB" (UMTS) or "eNodeB" (LTE). A cell is a geographical area where radio coverage is provided by the radio base station equipment at a base station site. Each cell is identified by an identity within the local radio area, which is broadcast in the cell. The base stations communicate over the air interface operating on radio frequencies with the user equipment units (UE) within range of the base stations.

In some versions of the radio access network, several base stations are typically connected (e.g., by landlines or microwave) to a controller node (such as a radio network controller (RNC) or a base station controller (BSC)) which supervises and coordinates various activities of the plural base stations connected thereto. The radio network controllers are typically connected to one or more core networks.

The Universal Mobile Telecommunications System (UMTS) is a third generation mobile communication system, which evolved from the second generation (2G) Global System for Mobile Communications (GSM). UTRAN is essentially a radio access network using wideband code division multiple access for user equipment units (UEs). In a forum known as the Third Generation Partnership Project (3GPP), telecommunications suppliers propose and agree upon standards for third generation networks and UTRAN specifically, and investigate enhanced data rate and radio capacity. Specifications for the Evolved Universal Terrestrial Radio Access Network (E-UTRAN) are ongoing within the $3^{rd}$ Generation Partnership Project (3GPP). The Evolved Universal Terrestrial Radio Access Network (E-UTRAN) comprises the Long Term Evolution (LTE) and System Architecture Evolution (SAE). Long Term Evolution (LTE) is a variant of a 3GPP radio access technology wherein the radio base station nodes are connected to a core network (via Access Gateways, or AGWs) rather than to radio network controller (RNC) nodes. In general, in LTE the functions of a radio network controller (RNC) node are distributed between the radio base stations nodes (eNodeB's in LTE) and AGWs. As such, the radio access network (RAN) of an LTE system has an essentially "flat" architecture comprising radio base station nodes without reporting to radio network controller (RNC) nodes.

In a cellular system a wireless terminal located in one cell may also receive interference from transmissions occurring in other cells, e.g., adjacent cells. Such Multi-cell interference in a cellular system is one of the most dominant sources of impairment. One solution for mitigating multi-cell interference is sometimes referred to as "Coordinated Scheduling". In Coordinated Scheduling multiple cells are connected to a central unit that coordinates the transmission/reception to and from the wireless terminals so that interference can be avoided. The interference avoiding coordination of Coordinated Scheduling typically involves scheduling users who are compatible to be active simultaneously over the same radio resource.

Since the network architecture with a centralized control unit may not be feasible for various considerations, a distributed method for coordinated scheduling has recently been disclosed in U.S. patent application Ser. No. 12/486,202, entitled "Network-Wide Inter-Cell Interference Minimization Via Coordinated Multipoint Cell Scheduling Coordination", which is incorporated herein by reference in its entirety. In this distributed method, the system is partitioned into sets of cells by a certain reuse factor. The cells in the same set do not interfere with each other due to the reuse distance and can therefore schedule data transmissions independently. The cells in different sets then communicate with each other to exchange scheduling information regarding anticipated data transmissions so that interference can be avoided during the data transmissions. This distributed method may approximate the performance of that of the centralized architecture, but does involve some complications.

In the above regard, the aforementioned distributed method assumes that the distributed coordination (e.g., scheduling information regarding the scheduled data transmissions) is completed before the actual data transmission begins. Operation premised on this assumption can pose a problem. To understand the problem, it must be realized that, in practice, the exchange of scheduling information takes place over an interface, e.g., an interface that connects two nodes or units that exchange the scheduling information. The interface has latency, and if the latency is sufficiently great the latency may negatively affect the responsiveness and performance of coordinated scheduling if the coordination procedure is not properly designed. In other words, the interface may have characteristics or encounter situations such that the exchange of scheduling information over the interface is slowed or delayed and thus a hindrance to the coordination and data transmission operations. An example of such an interface with the potential of such a problem may be an interface in a switched network (such as an X-2 interface in the case of LTE). Thus, the latency of the interface may frustrate the timely exchange of scheduling information and the subsequent data transmissions that are scheduled in accordance with the scheduling information.

The complications of the foregoing distributed coordination method may be understood with reference to FIG. 1. For simplification FIG. 1 shows a cell layout with a reuse factor of three. In the distributed coordinated scheduling method mentioned previously, the cells are divided into three sets, i.e., numbered sets 0, 1, and 2. In FIG. 1 each set of cells has a different interior design fill. For example, set 0 has a vertically hatched interior design; set 1 has a cross-hatched interior design; set 2 has a stippled or dotted interior design. The cells in a same set can schedule users independently since the cells of the same set are separated by the reuse distance (the reuse distance is assumed to be large enough so that inter-cell interference of same set cells is negligible). The cells in different sets, on the other hand, do interfere with their immediate neighboring cells and therefore should coordinate with each. One manner of coordination is described below.

The cells in each set take turn scheduling in a certain order (e.g., vertical interior fill, then cross-hatched interior fill, then stippled interior fill, for example), independently from other cells in the same set. The cells in the scheduling set should avoid causing interference to cells in the sets that have already scheduled, and then pass sufficient information to neighboring cells in the sets that are yet to schedule so that the same interference avoidance measure can be taken.

For example, following the order of set 0, set 1, and set 2, the cells in set 0 first schedule their users and pass that information to neighboring cells in set 1 and set 2. The cells in set 1 then schedule their users, making sure that the interference to users in neighboring cells of set 0 does not exceed a certain target, and then pass that information to neighboring cells in set 2. Finally, upon receiving the scheduling information from the neighboring set 0 and set 1 cells, the cells of set 2 proceed to schedule their users, making sure that interference to scheduled users in the neighboring cells of set 0 and set 1 does not exceed a certain target. All the scheduling and information passing should take place before the data transmission phase. The order in which the three sets perform their scheduling may be changed from time to time so that fairness can be maintained.

The assumption that the coordination process is completed before the data transmission takes place implies that a Coordination Time Interval (CTI) can be no greater than a Scheduling Time Interval (STI), as shown in FIG. 2. FIG. 2 particularly shows two essentially parallel tracks of processing: the foreground processing of user data transmissions which is comprised of Scheduling Time Intervals (STI), and background processing which includes the exchange of scheduling information in plural Broadcast Time Intervals (BTIs). If Broadcast Time Interval (BTI) is defined as the time it takes for a cell to communicate its scheduling information to the neighboring cells plus any other processing delay, then the Coordination Time Interval (CTI) must be no less than the Broadcast Time Interval (BTI) multiplied by the reuse factor. As illustrated in FIG. 2, before a Scheduling Time Interval (STI) can begin its corresponding background processing, which occurs in the corresponding Coordination Time Interval (CTI), must be completed.

In the case of Long Term Evolution (LTE), Broadcast Time Interval (BTI) can be loosely interpreted as the X2 interface latency, which ranges from a few msec to several hundred msec, depending on the deployment. For a reuse factor of 3, 4 or 7, the existing solution may have a Scheduling Time Interval (STI) on the order of a second.

A delay of this magnitude can significantly degrade the system performance due to factors such as mismatch in signal strength between the time of measurement and the time of data transmission. The achievable user data rate determined by link adaptation mechanism during the coordination period may also become invalid during data transmission, resulting in unnecessary retransmissions.

Furthermore, the distributed coordinated scheduling method disclosed previously did not consider the problem of link adaptation. Link adaption is essentially defined as the matching of modulation, coding and other signal and protocol parameters to the conditions of the radio link. The scheduling information is passed in one direction from the cells with higher order to those with lower order. To be able to perform adequate link adaptation, the scheduling information from all neighboring cells need to be available prior to the data transmission. The broadcast of scheduling information should therefore be in the opposite direction as well.

U.S. patent application Ser. No. 11/681,302, "METHOD AND APPARATUS FOR RESOURCE REUSE IN A COMMUNICATION SYSTEM," filed Mar. 2, 2007, published as US 2008/0212539, and incorporated herein by reference, discloses a method for exchanging scheduling information in advance of data transmission so that more accurate link adaptation can be achieved.

SUMMARY

To address this previously overlooked problem, the technology disclosed herein discloses method and apparatus for efficiently coordinating multi-service area (e.g., multi-cell) scheduling in a manner which, e.g., minimizes the impact of network latency.

In one of its aspects the technology disclosed herein comprises a method of operating an apparatus associated with a telecommunications node, e.g., a node which serves a service area which belongs to one set of plural sets of service areas comprising a network. In its basic form the method comprises the apparatus dividing a time resource for the node into plural phases in coordinated manner with other service areas (with a predetermined number of consecutive phases forming one cycle). The method further comprises the apparatus generating a schedule for transmission/reception of user traffic for wireless terminals served by the node for plural consecutive phases. The schedule is generated so that during the plural consecutive phases the node can transmit and receive scheduled user traffic before receiving in the plural consecutive phases scheduling information from another node which serves another set of service areas.

In an example embodiment and mode the method further comprises the apparatus generating, during a selected phase of the cycle, the schedule for transmission/reception of the user traffic for plural user groups over a respective plural number of consecutive phases following the selected phase (the plural user groups comprising wireless terminals served by the node); and, the apparatus forming at least some of the plural user groups in dependence upon radio channel conditions occurring with respect to operation of wireless terminal users of other service areas previously scheduled for the respective plural consecutive phases following the selected phase.

In an example embodiment and mode the method further comprises the apparatus forming and scheduling at least one user group for a phase in which wireless terminal users of other service areas are not previously scheduled.

In an example embodiment and mode, the node serves the service area which belongs to one set of N number of sets of service areas comprising the network, where N is an integer reuse factor for the sets of service areas of the network. In such example embodiment and mode the method further comprises dividing the time resource for the node into N number of phases; forming N number of user groups; and, during the selected phase of the cycle, generating the schedule for transmission/reception of the user traffic for the N user groups over a respective N number of consecutive phases following the selected phase.

In an example embodiment and mode, the method further comprises sending at least a portion of the schedule to the neighboring service areas of the network during the selected phase. In a yet further implementation, the method further comprises, during a phase other than the selected phase, sending to the neighboring service areas any portion of the schedule that was not sent during the selected phase.

In an example embodiment and mode, the method further comprises forming the plural groups during the selected phase of the cycle, the plural groups thereby being defined for duration of the plural consecutive phases following the selected phase.

In an example embodiment and mode, the method further comprises, during each phase of the cycle, the node receiving scheduling information previously sent from neighboring service areas of the network.

In an example embodiment and mode, the act of dividing the time resource in coordinated manner with other service areas further comprises aligning service areas of a same set with same phases and staggering service areas of differing sets with offset phases.

In an example embodiment and mode the selected phase is a first phase of the plural consecutive phases.

In an example embodiment and mode, the method further comprises, during each phase of the cycle, setting a rate for user traffic that is to be transmitted/received during the respective phase.

In an example embodiment and mode the node is a base station node and the service area is a cell served by the base station.

In an example embodiment and mode the node is another network node, such as a radio network controller (RNC) node, and the service area is a group of cells served by the network node.

In an example embodiment and mode the node is a portion of a radio base station node and the service area is a sector served by the radio base station node In another of its aspects the technology disclosed herein concerns an apparatus associated with a node of a radio access network, e.g., a node which serves a service area which belongs to one set of plural sets of service areas comprising the network. In an example embodiment the apparatus comprises electronic circuitry comprising a phase controller and a scheduler. The phase controller is configured to divide a time resource for the node into plural phases in coordinated manner with other service areas, with a predetermined number of consecutive phases forming one cycle. The scheduler is configured to generate a schedule for transmission/reception of user traffic for wireless terminals served by the node for plural consecutive phases whereby during the plural consecutive phases the node can transmit and receive scheduled user traffic before receiving in the plural consecutive phases scheduling information from another node which serves another set of service areas.

In an example embodiment the electronic circuitry is further configured, during a selected phase of the cycle, to generate the schedule for transmission/reception of the user traffic for plural user groups over a respective plural number of consecutive phases following the selected phase (the plural user groups comprising wireless terminals served by the node); and, to form at least some of the plural user groups in dependence upon radio channel conditions occurring with respect to operation of wireless terminal users of other service areas previously scheduled for the respective plural consecutive phases following the selected phase.

In an example embodiment the node comprises a communications interface configured, during the selected phase, to send at least a portion of the schedule to the neighboring service areas of the network. In an example implementation, the communications interface is configured, during a phase other than the selected phase, to send to the neighboring service areas any portion of the schedule that was not sent during the selected phase.

In an example embodiment the scheduler is further configured to form and schedule at least one user group for a phase in which wireless terminal users of other service areas are not previously scheduled.

In an example embodiment, the node serves the service area which belongs to one set of N number of sets of service areas comprising the network, where N is an integer reuse factor for the sets of the service areas of the network. In such example embodiment the scheduler is configured to divide the time resource for the node into N number of phases; form N number of user groups; and, during the selected phase of the cycle, generate the schedule for transmission/reception of the user traffic for the N user groups over a respective N number of consecutive phases following the selected phase.

In an example embodiment the scheduler is further configured to form the plural groups during the selected phase of the cycle, the plural groups thereby being defined for duration of the plural consecutive phases following the selected phase.

In an example embodiment the scheduler is further configured, during each phase of the cycle, to receive scheduling information previously sent from neighboring service areas of the network.

In an example embodiment the scheduler is further configured to divide the time resource in coordinated manner with other service areas by aligning service areas of a same set with same phases and by staggering service areas of differing sets with offset phases.

In an example embodiment the selected phase is a first phase of the plural consecutive phases.

In an example embodiment the scheduler is further configured, during each phase of the cycle, to set a rate for user traffic that is to be transmitted/received during the respective phase.

The node with which the apparatus is associated can take several forms. For example, in one example embodiment the node is a base station node and the service area is a cell served by the base station. In another example embodiment the node is a network node, such as a radio network controller (RNC) node, and the service area is a group of cells served by the network node. In yet another example embodiment the node is a portion of a radio base station node and the service area is a sector served by the radio base station node.

In another of its aspects the technology disclosed herein concerns a method of operating a communications network comprising plural nodes, with each node serving a service area which belongs to one set of plural sets of service areas comprising the network. The network operation method comprises: (1) in coordinated manner dividing a time resource for the plural nodes into plural phases, with a predetermined number of consecutive phases forming one cycle, with cycles of differing sets beginning with differing phases; and (2) for each of the plural nodes, scheduling transmission/reception of user traffic for wireless terminals served by the respective node for plural consecutive phases whereby during the scheduled plural consecutive phases each node can transmit and receive scheduled user traffic before receiving in the plural consecutive phases scheduling information from a node which serves another set of service areas.

In an example embodiment and mode, the network operation method further comprises each of the plural nodes performing the prospective scheduling of the transmission/reception of user traffic in a first phase of the cycle; and each of the plural nodes prospectively scheduling the transmission/reception of user traffic for plural phases following the first phase of the cycle.

In an example embodiment and mode, each node serves a respective service area which belongs to one set of N number of sets of service areas comprising the network, where N is an integer reuse factor for the sets of service areas of the network, and the network operation method further comprises dividing the time resource for the node into N number of phases; and during the selected phase of the cycle, generating the schedule for transmission/reception of the user traffic over a respective N number of consecutive phases following the selected phase.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION

Figure 1:
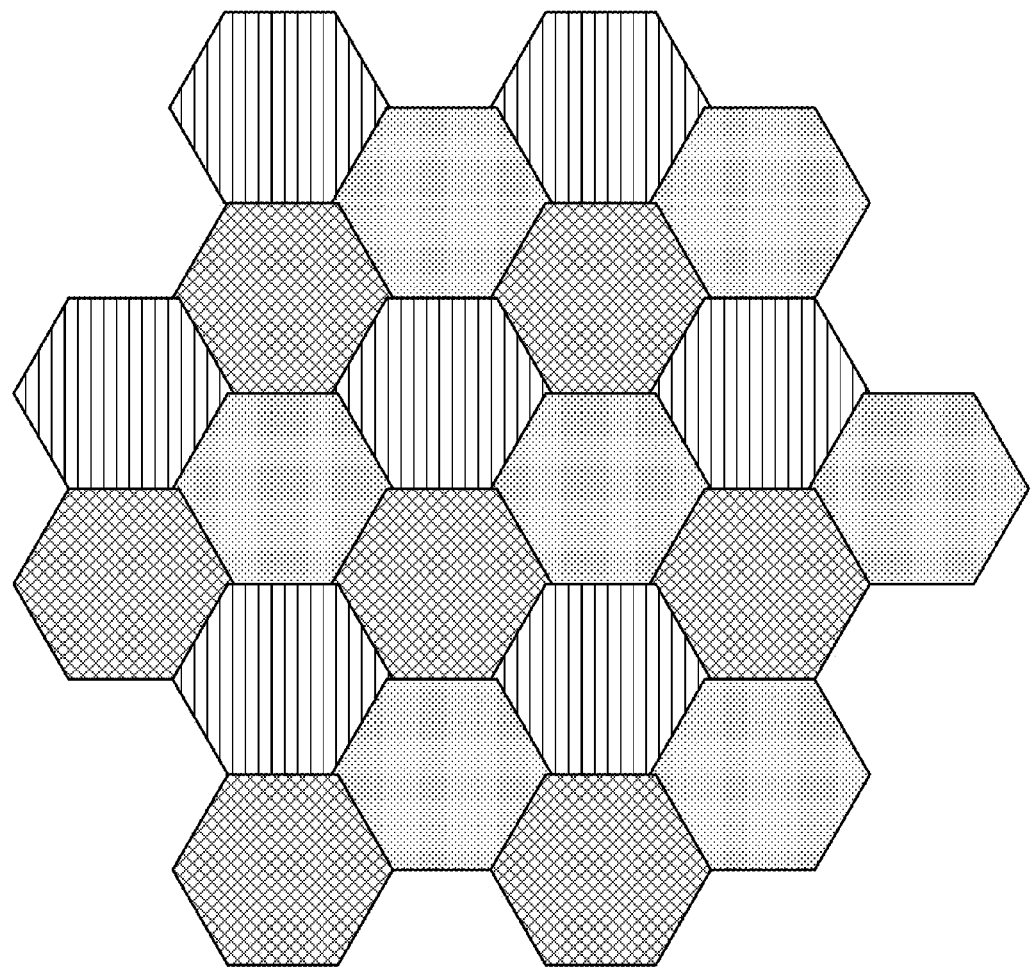
FIG. 1 is a diagrammatic view of a network of sets of cellular regions.
Figure 1:
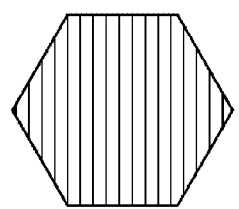
Figure 1:
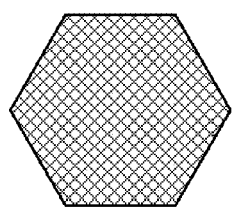
Figure 1:
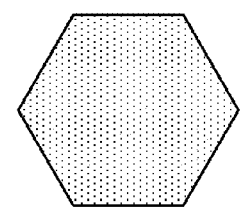
Figure 2:
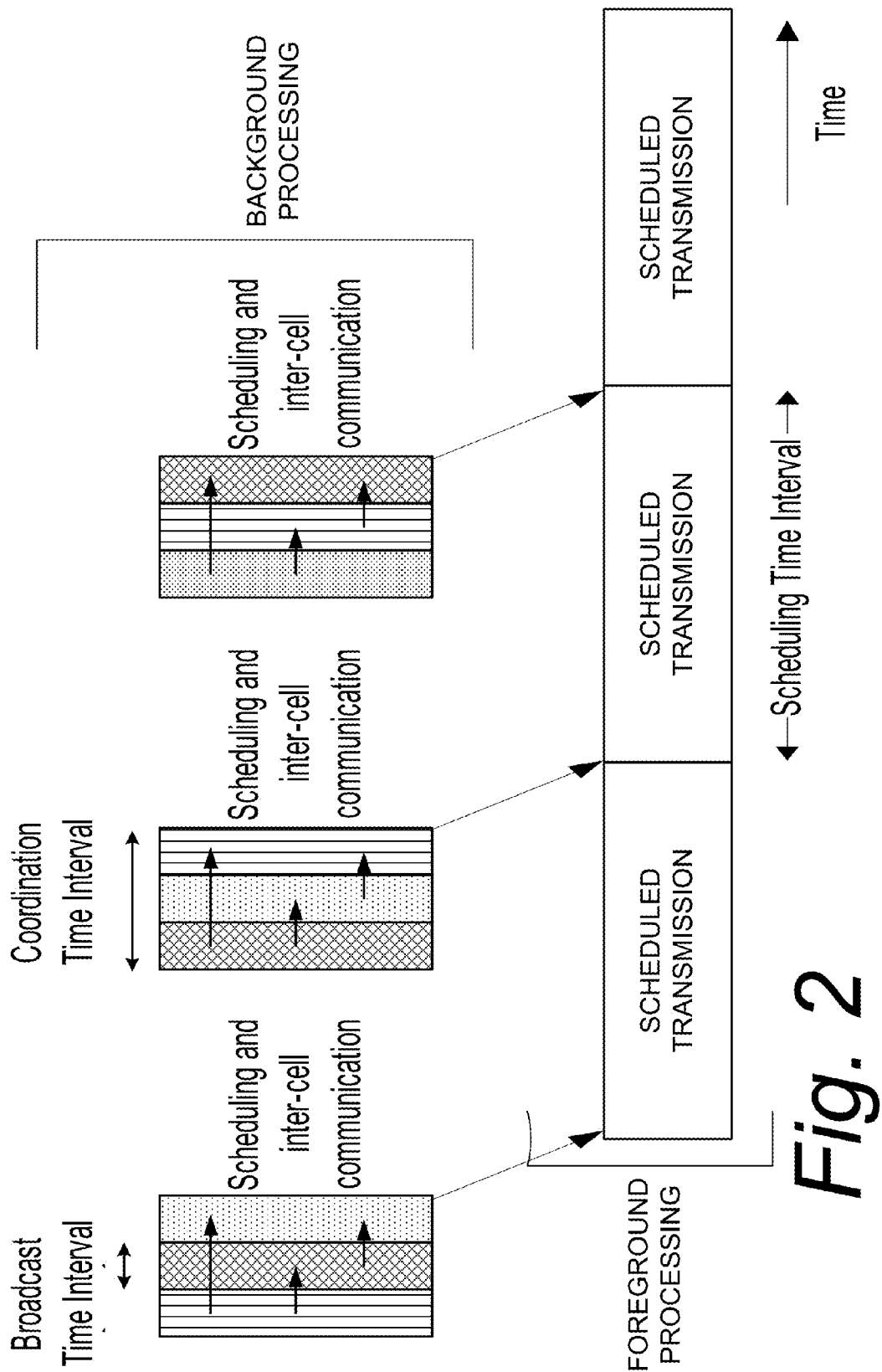
FIG. 2 is a diagrammatic view depicting parallel processing paths including background coordination processing and foreground transmission processing.

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. That is, those skilled in the art will be able to devise various arrangements which, although not explicitly described or shown herein, embody the principles of the invention and are included within its spirit and scope. In some instances, detailed descriptions of well-known devices, circuits, and methods are omitted so as not to obscure the description of the present invention with unnecessary detail. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry or other functional units embodying the principles of the technology. Similarly, it will be appreciated that any flow charts, state transition diagrams, pseudocode, and the like represent various processes which may be substantially represented in computer readable medium and so executed by a computer or other processor, whether or not such computer or processor is explicitly shown.

The functions of the various elements including functional blocks, including but not limited to those labeled or described as "computer", "processor" or "controller", may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented.

In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and (where appropriate) state machines capable of performing such functions.

In terms of computer implementation, a computer is generally understood to comprise one or more processors or one or more controllers, and the terms computer and processor and controller may be employed interchangeably herein. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" shall also be construed to refer to other hardware capable of performing such functions and/or executing software, such as the example hardware recited above.

The technology disclosed herein concerns multi-service area scheduling coordination, e.g., the coordination of scheduling among plural service areas of user traffic (e.g., wireless transmissions and receptions) for wireless terminals. In some of its aspects the technology disclosed herein involves embodiments of a network apparatus, also known as a coordinating scheduling apparatus, configured to perform the scheduling coordination for plural service areas, and methods of operating such network apparatus. The coordinating scheduling apparatus is associated with a telecommunications node, e.g., a node which serves a service area. The served serviced area in turn which belongs to one set of plural sets of service areas comprising a network. In differing embodiments, the node with which the coordinating scheduling apparatus is associated can take differing forms in accordance with respective differing hierarchical conceptions of the service areas.

Figure 3:
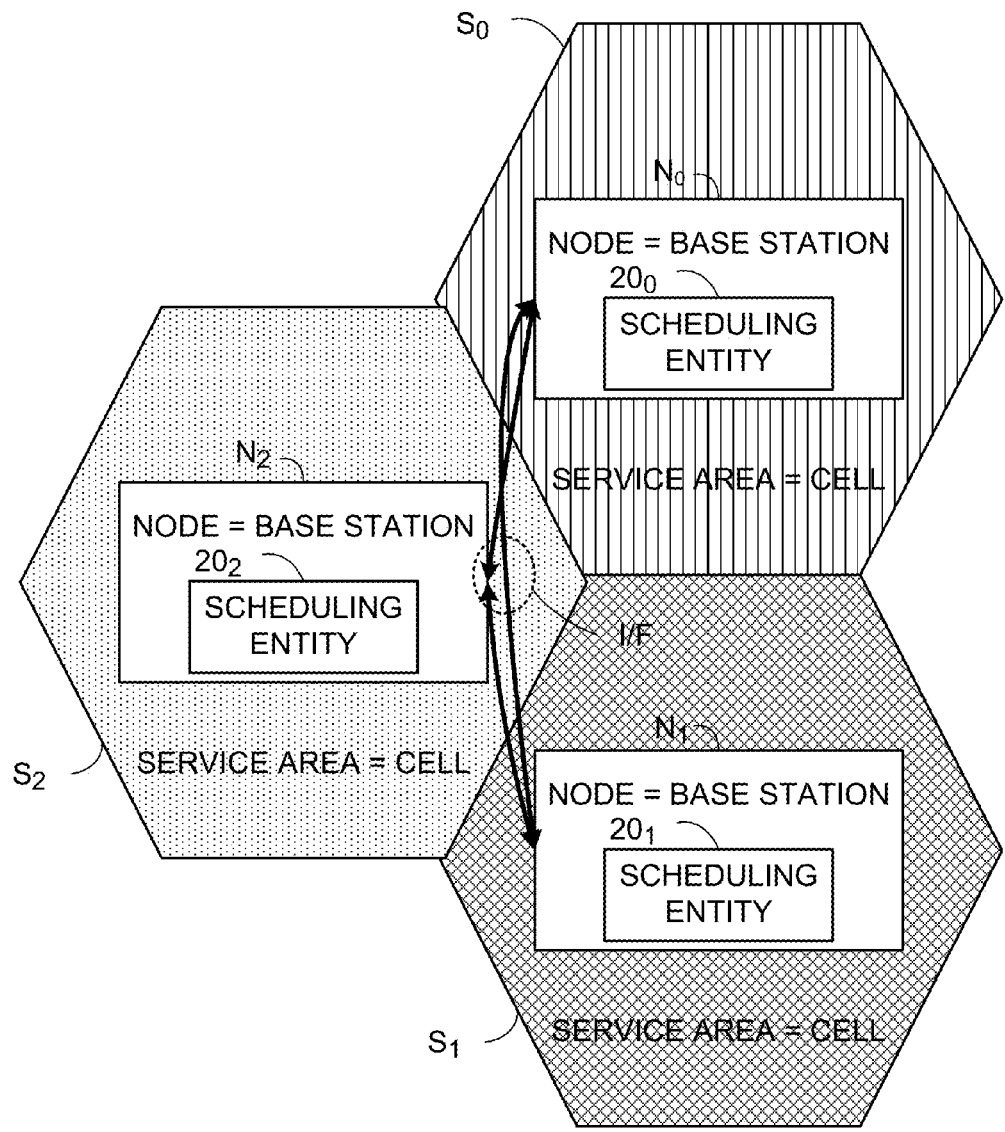
FIG. 3, FIG. 4, FIG. 5, and FIG. 6 are diagrammatic views showing service areas of networks according to differing hierarchical network arrangements.

FIG. 3 illustrates a portion of a network comprising plural service areas, with interiors of the plural service areas being represented in essentially like manner with the cells of FIG. 1. For example, the network of FIG. 1 includes first service area $S_0$ depicted as a hexagon with vertical interior fill; second service area $S_1$ depicted as a hexagon with cross hatched interior fill; and third service area $S_2$ depicted as a hexagon with stippled interior fill. Each of the three differently depicted service areas belong to differing sets of service areas in similar fashion as do the cells of FIG. 1. For example, first service area $S_o$ belongs to set 0; second service area $S_1$ belongs to set 1; and third service area $S_2$ belongs to set 2. Accordingly, it should be understood that the service areas shown in FIG. 3 are preferably integrated into a larger context of service areas which are patterned essentially in the manner of FIG. 1.

Each service area is served by a corresponding node N, e.g., first service area $S_0$ is served by node $N_0$; second service area $S_1$ is served by node $N_1$; and third service area $S_2$ is served by node $N_2$. In fact, in the FIG. 1 embodiment the service areas are cells served by a node which takes the form of a radio base station node, e.g., a RBS, NodeB, or eNodeB, depending on type of radio access network in which the base station is employed.

Moreover, the FIG. 3 and other embodiments the nodes N communicate over interfaces also referenced herein known as network interfaces or inter-node interfaces. Examples of such interfaces are represented by double-headed arrows in FIG. 3 and other figures. A broken line oval collectively references the network or inter-node interfaces by the moniker I/F. The particular media utilized by the interfaces I/F is not critical. In some embodiments the media for interfaces I/F can be wired while in other embodiments the media for the interfaces I/F can be wireless (e.g., radio, microwave, etc). In some embodiments the interfaces I/F may even include intermediate nodes such as switches.

As explained previously, the latency of comparable interfaces in prior art systems may impede distribution of scheduling information among the nodes, with the result that in the prior art not only scheduling but transmission/reception of user traffic may be hampered. Fortunately the technology disclosed herein significantly moots and/or overcomes such interface latency issues, thereby affording both efficient scheduling coordination over the plural service areas and more efficient user traffic flow. Such advantage is facilitated by the provision of a coordinating scheduling apparatus, embodiments of which are described herein. In the embodiment of FIG. 3 it so happens that each node N comprises such a coordinating scheduling apparatus 20, e.g., node $N_0$ serving first service area $S_0$ is comprised of coordinating scheduling apparatus $20_0$; node $N_1$ serving second service area $S_1$ is comprised of coordinating scheduling apparatus $20_1$; and, node $N_2$ serving third service area $S_2$ is comprised of coordinating scheduling apparatus $20_2$.

Figure 4:
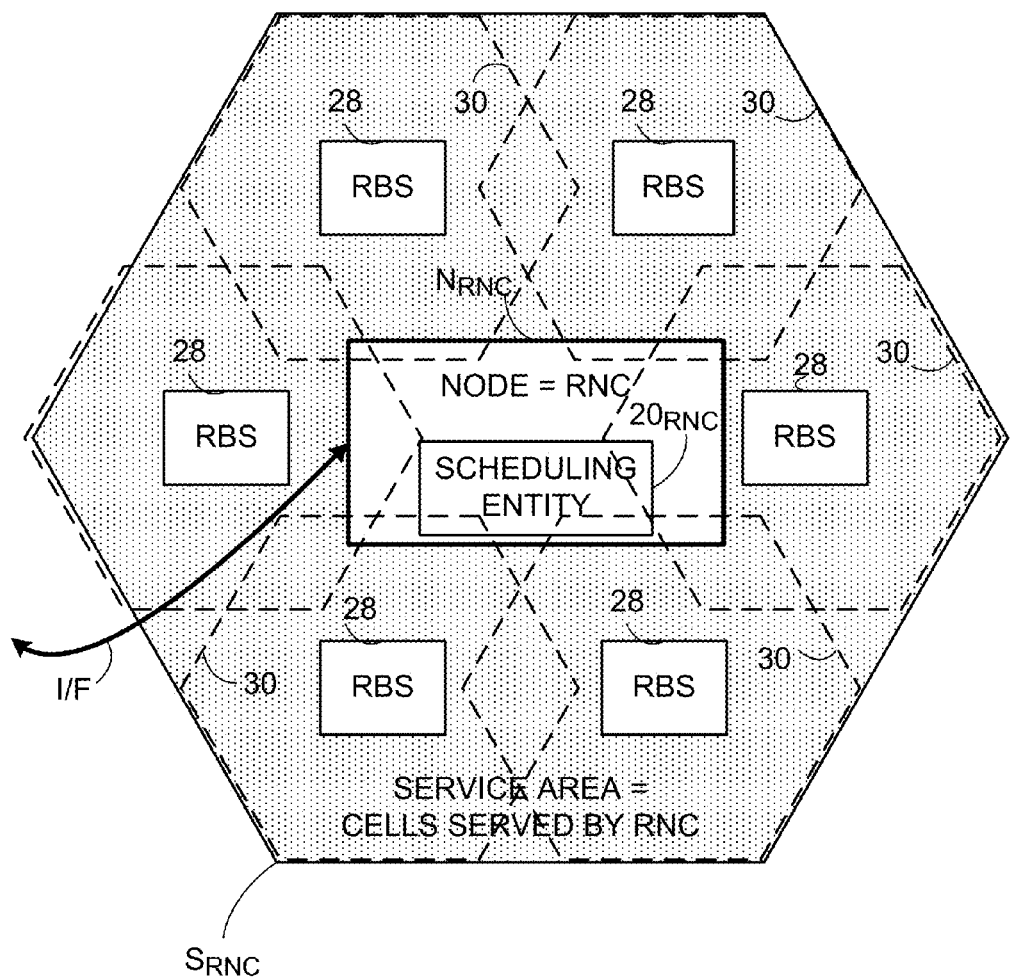

Thus FIG. 3 depicts an example network in which the service areas are cells which are served by radio base stations. However, as used herein he term "service area" is not limited to a cell, but may be another hierarchical level of coverage or jurisdiction. As a consequence, the term "node" is not limited to a radio base station node per se. For example, FIG. 4 illustrates a scenario in which a service area $S_{RNC}$ is a region served by a node which is superior to a radio base station node, e.g., a network node such as a base station controller node (BSC) or radio network controller (RNC). Using the terminology "RNC" merely as representative of such type of superior or network node, FIG. 4 depicts node $N_{RNC}$ as serving service area which comprises a large outer hexagon $S_{RNC}$. The node $N_{RNC}$ is shown as serving plural radio base station nodes 28, with each base station node 28 in turn serving a radio base station cell 30 (depicted by smaller broken hexagons included with the larger hexagonal service area $S_{RNC}$ served by node $N_{RNC}$). It will be understood that the service area $S_{RNC}$ belongs to a set of RNC-based service areas, and that adjacent RNC-based service areas of other sets typically surround or are adjacent to service area $S_{RNC}$ in FIG. 4. In the example illustration of FIG. 4, service area $S_{RNC}$ belongs to the third set S2 in view of its stippled interior depiction. The node $N_{RNC}$ of FIG. 4 is connected by one or more interfaces I/F to comparable nodes of other, e.g., adjacent, service areas. It will be appreciated that the network node need not be confined to a radio network controller (RNC) node, but that the network node can take other forms such as a gateway node that is serving a group of cells.

Figure 5:
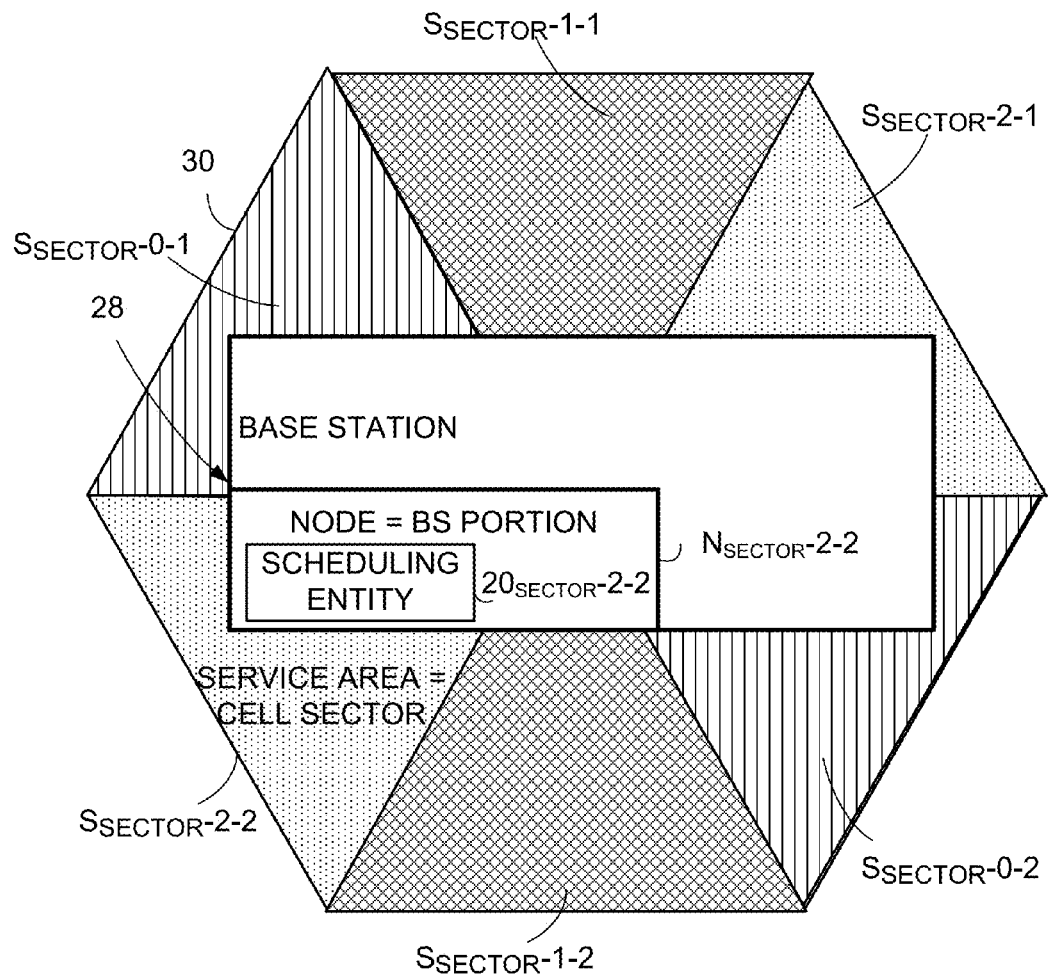

As yet another example of hierarchical arrangement, FIG. 5 illustrates a scenario in which a service area $S_{SECTOR}$ is a region of a cell served by a node, the node for this embodiment being conceptualized as a portion of a radio base station node that serves the sector of the cell. In FIG. 5 the radio base station node 28 serves a cell 30 which takes the form of the sole hexagon depicted in FIG. 5. The hexagon of FIG. 5 is divided into six triangular sectors which are the six service areas of the FIG. 5 embodiment. The six service areas $S_{SECTOR-0-1}$ through $S_{SECTOR-2-2}$ of FIG. 5 are grouped into sets of service areas, with (for example) service areas $S_{SECTOR-0-1}$ and $S_{SECTOR-O-2}$ belonging to the vertically hatched first set, i.e., set 0; service areas $S_{SECTOR-1-1}$ and $S_{SECTOR-1-2}$ belonging to the cross hatched second set, i.e., set 1; and service areas $S_{SECTOR-2-1}$ and $S_{SECTOR-2-2}$ belonging to the stippled third set, i.e., set 2. For sake of simplification FIG. 5 shows one sector-serving portion of the base station 28, e.g., a portion of base station 28 involved in serving the sector service area $S_{SECTOR-2-2}$, which serves as the node $N_{SECTOR-2-2}$ for the FIG. 5 embodiment. It will be appreciated that other sectors served by the base station 28 are also served by portions of the base station 28, and that some aspects or elements of the base station 28 may be shared among the various sectors. Moreover, the interfaces which interconnect the sector-serving nodes may be internal to the base station node.

Figure 6:
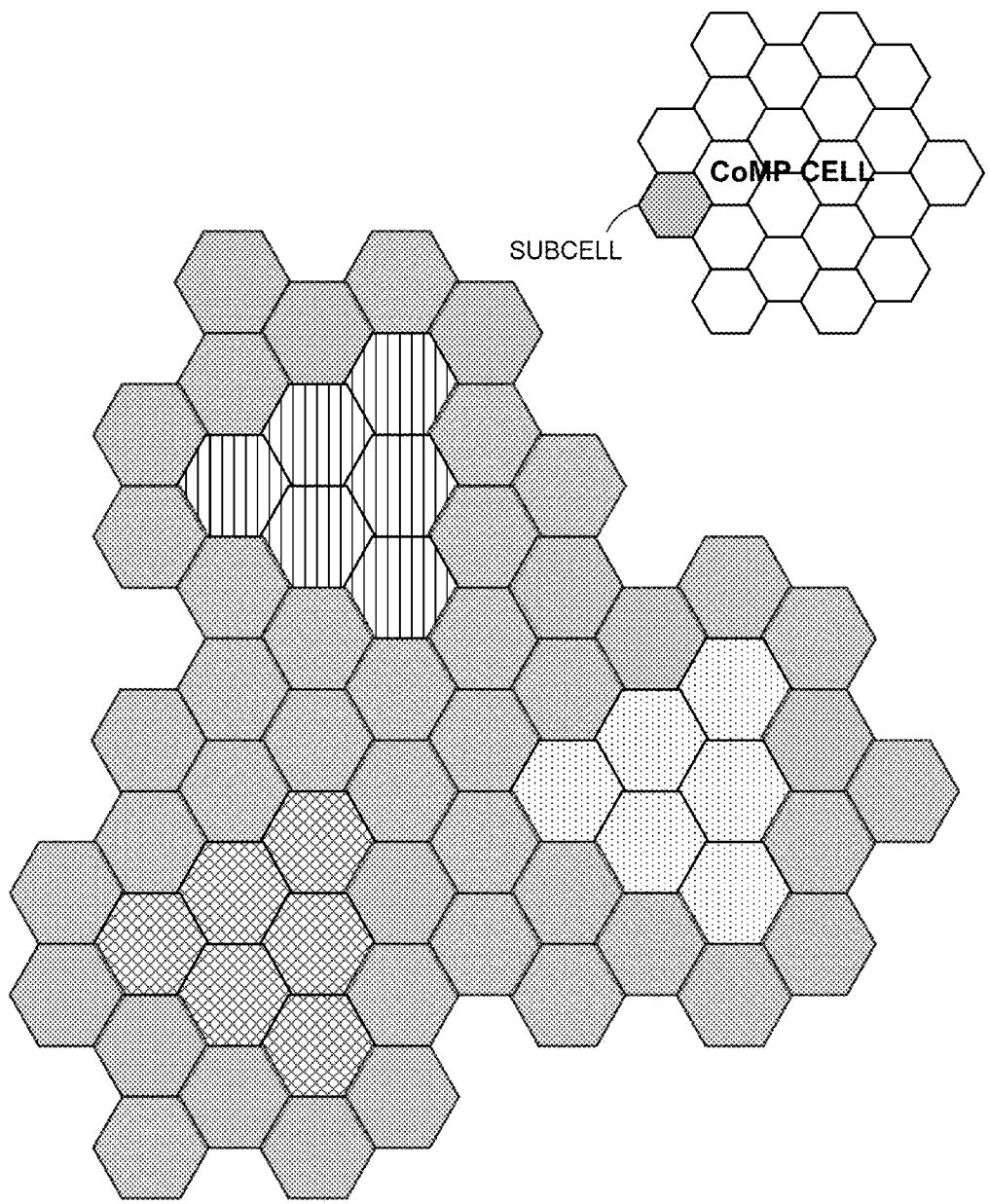

Moreover, as still yet another example the subsequent interpretation of a "cell" should not be limited to the conventional cellular architecture. It may represent a cluster of smaller cells under the control of a central unit such as the Coordinated Multi-Point (CoMP) architecture shown in FIG. 6. In CoMP architecture a CoMP cell is a collection of sub-cells connected to a central node that coordinates the transmission/reception of user signals to mitigate interference among the smaller sub-cells. CoMP architecture is understood with reference to, e.g., U.S. patent application Ser. No. 12/563,589, entitled "Inter-Cell Interference Mitigation", also published as United States Patent Publication US 2010/0261493, which is incorporated herein by reference in its entirety.

For sake of simplification three different sets of service areas, with three different interior depictions (vertically hatched, cross hatched, and stippled), are typically illustrated herein. Employment of three different sets of service areas is not critical or limiting, as indeed a different number of sets of service areas may be employed. Nor do the hexagonal or other illustrated shapes of service areas imply or involve any particular constraint or limitation, such depictions again serving only as convenient examples.

Figure 7:
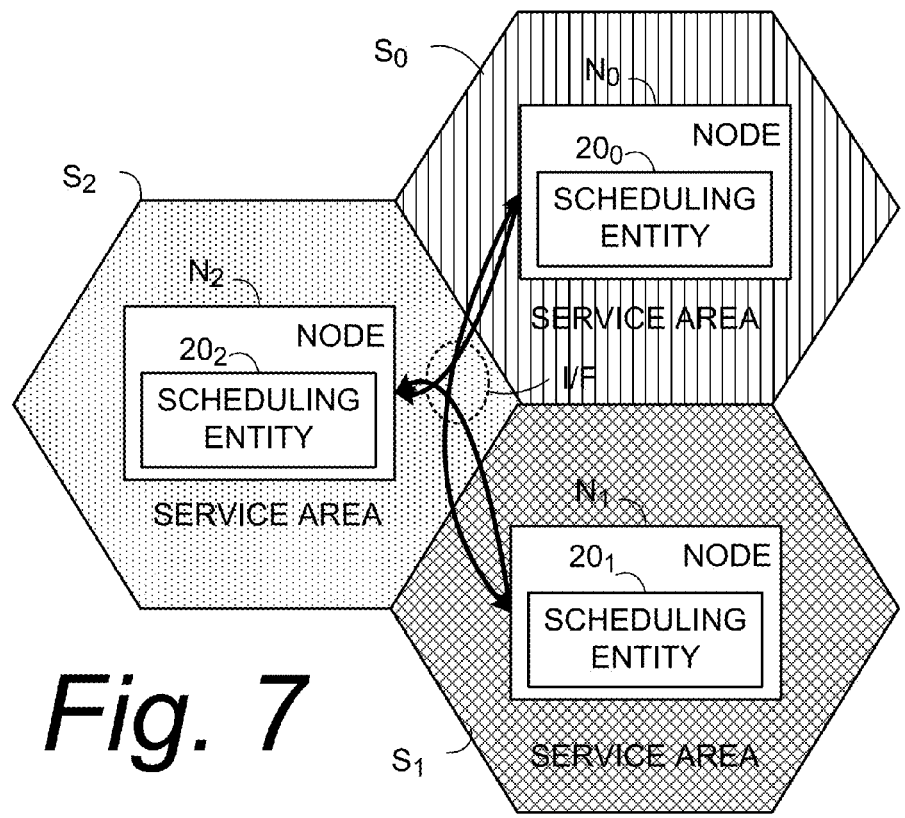
FIG. 7, FIG. 8, and FIG. 9 are diagrammatic views showing location and/or arrangement of a coordinating scheduling apparatus relative to one or more nodes of a network.

FIG. 7, like FIG. 3, FIG. 4, and FIG. 5 show the coordinating scheduling apparatus 20 for each service as comprising or being included in a node. As used herein, a "node" can be a logical node with physical elements distributed in different physical locations. For example, in some example embodiments "node" includes a structure such as a base station which has split functionality, e.g., functionality separately into a radio part and a baseband part, with the radio part and baseband part being physically separated or remote from one another. Thus, a "node" is not constrained to one physical location, but can be distributed or spread out, i.e., not necessarily centrally located. Moreover, the coordinating scheduling apparatus 20 may represent one or more physical devices co-located with or remote from a particular node that is associated with the apparatus. As such, coordinating scheduling apparatus 20 need not necessarily be physically located in or with the relevant node but can be situated external to and/or remote from the node.

Figure 8:
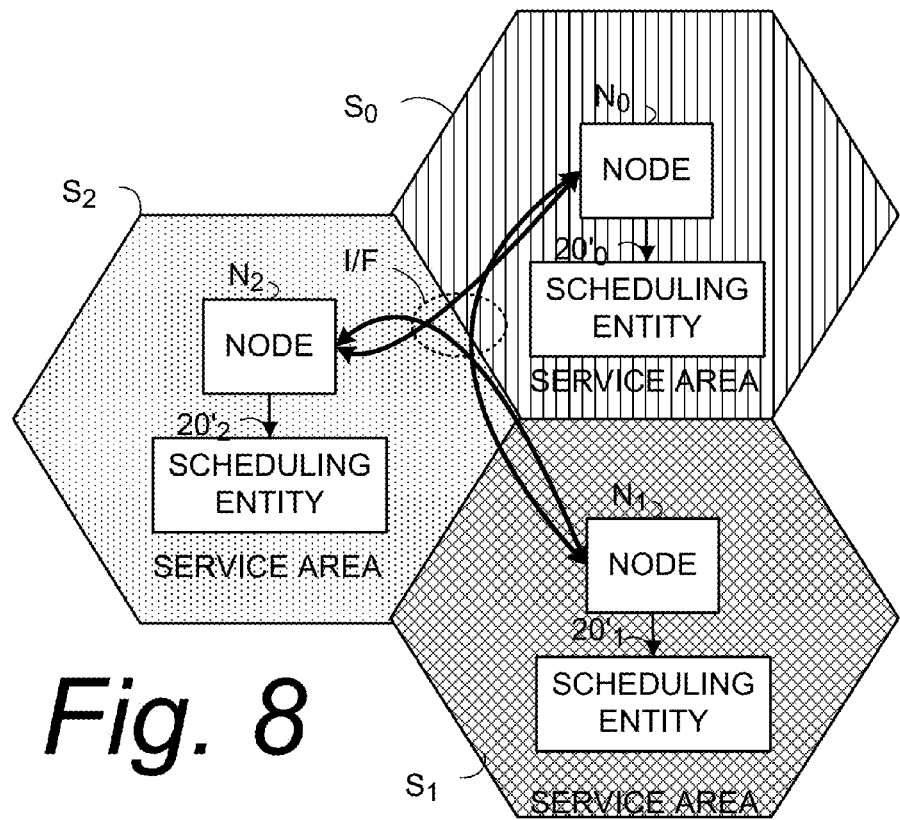
Figure 9:
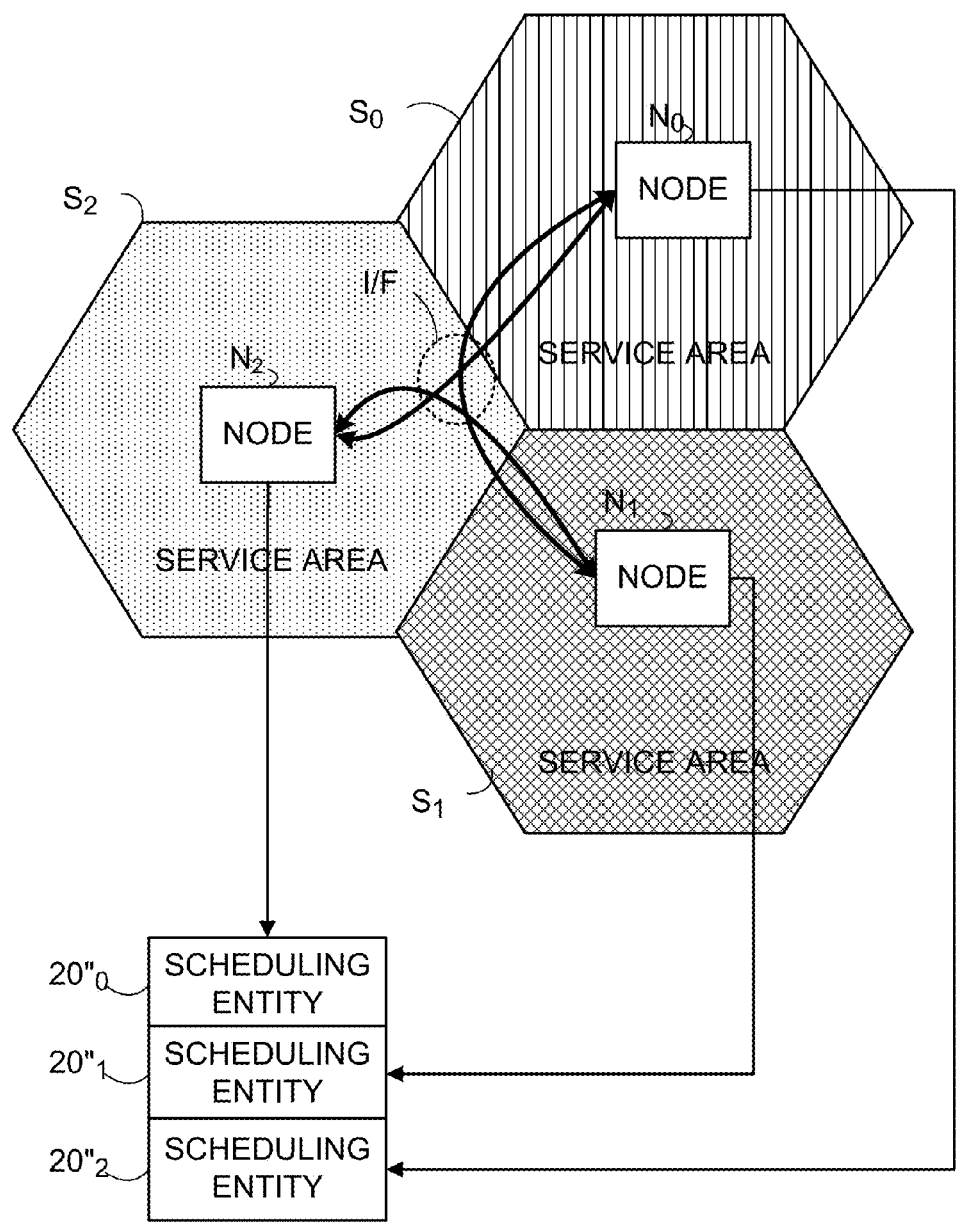

Thus, situation and/or location of the coordinating scheduling apparatus 20 is not limited to co-location with or at or internal to the node. For example, FIG. 8 illustrates coordinating scheduling entities 20' which are external to each node N. Such coordinating scheduling entities 20' can be separate or standalone nodes, service points, or constituent units or functionalities of yet other nodes. In fact, as another example FIG. 9 illustrates three service areas having nodes N which are associated with coordinating scheduling entities 20" which are co-located with one another.

In view of the foregoing and other considerations, it should be understood that the term "coordinating scheduling apparatus" refers to a logical entity, unit, or functionality that may represent one or more physical components whose location is not to be limiting or viewed as critical.

Figure 10:
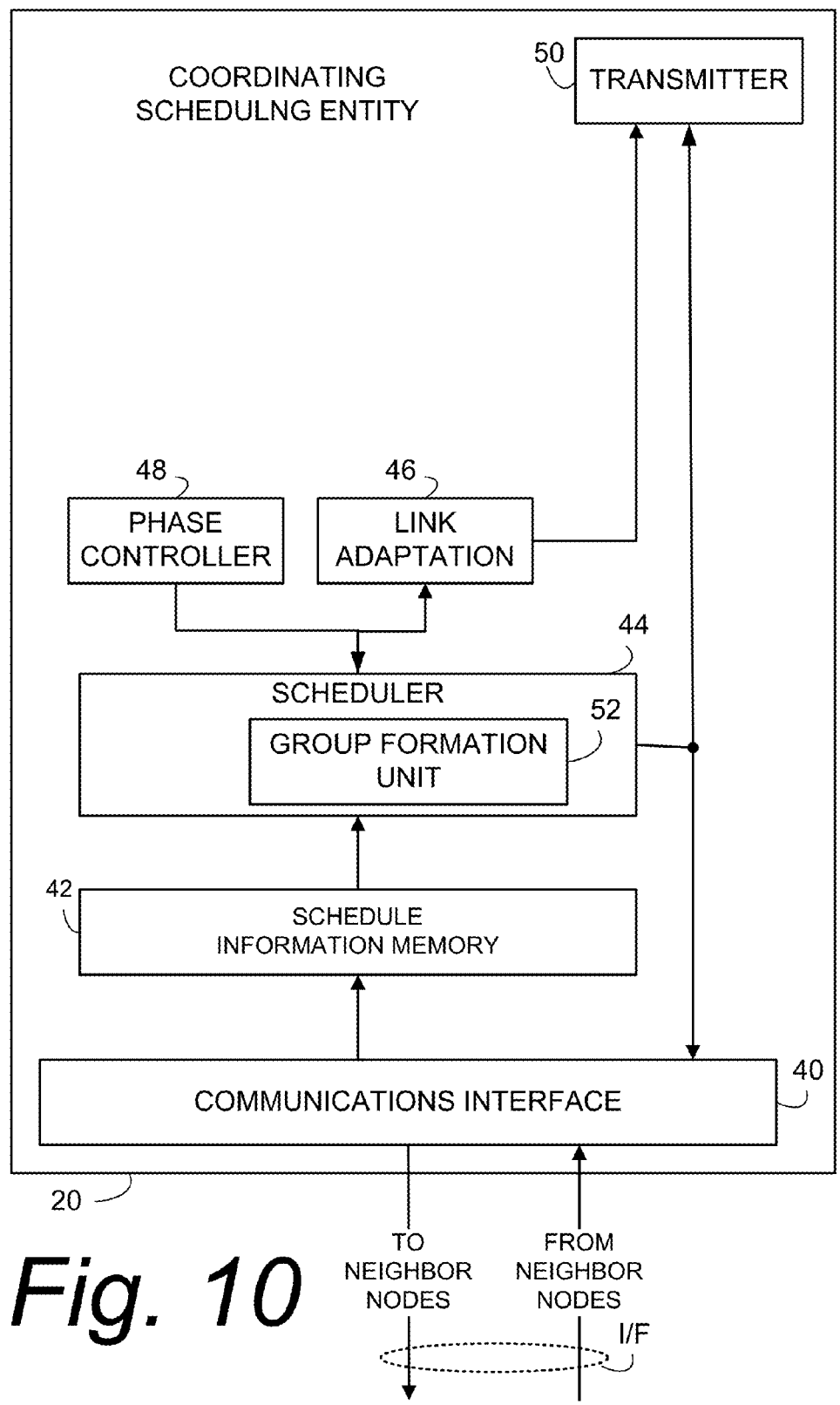
FIG. 10 is a schematic view of an example embodiment of a generic coordinating scheduling apparatus.

FIG. 10 illustrates example, representative units or functionalities comprising a generic coordinating scheduling apparatus 20. According to the example embodiment of FIG. 9, coordinating scheduling apparatus 20 comprises communication interface 40; scheduling memory 42; scheduler 44; link adaptation unit 46; phase controller 48; and transmitter 50. As explained hereinafter, scheduler 44 comprises, e.g., group formation unit 52.

As understood from the foregoing, one or more of these elements or functionalities may be shared with or provided by the node with which the coordinating scheduling apparatus 20 is associated.

Figure 11:
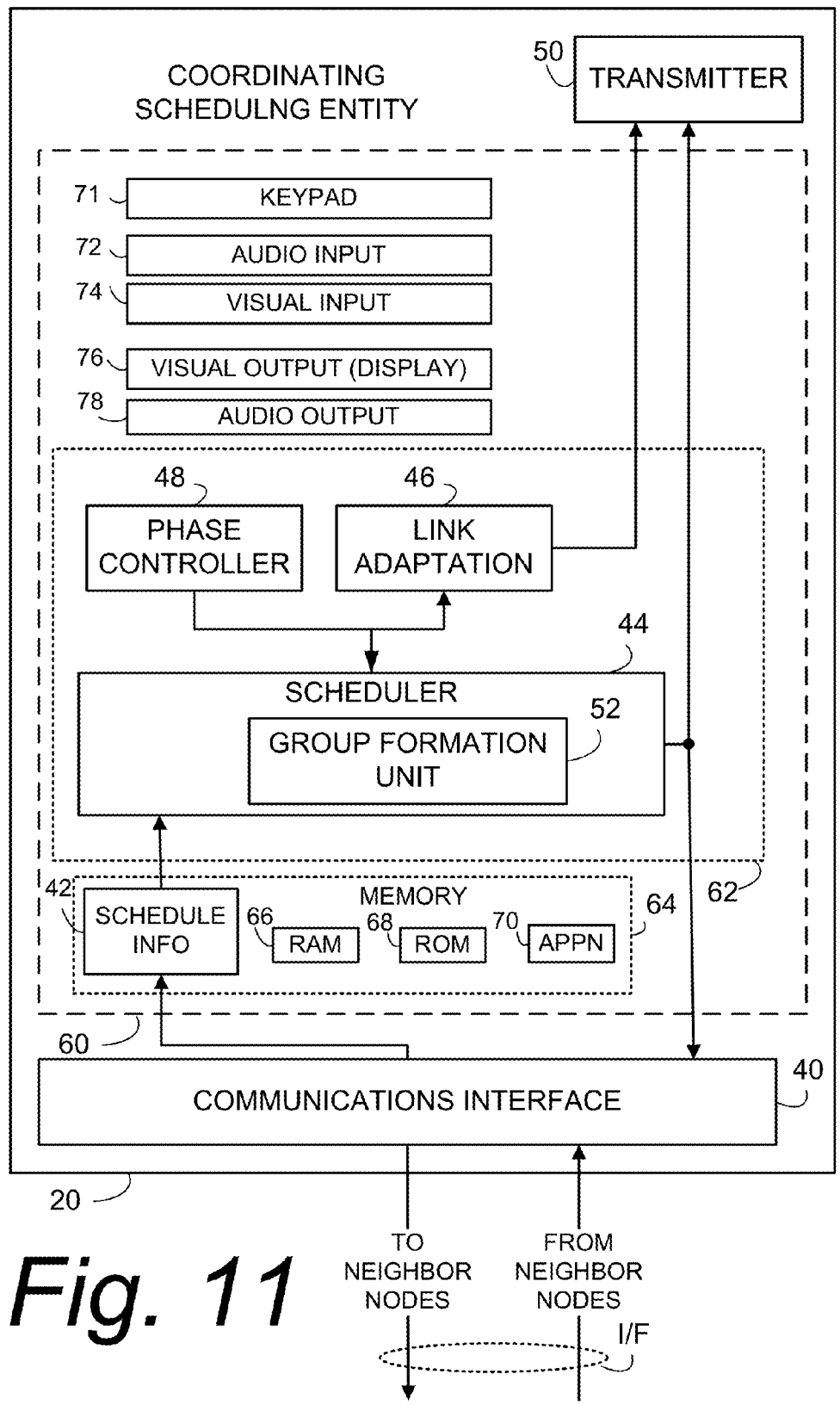
FIG. 11 is a schematic view illustrating how an example embodiment of a coordinating scheduling apparatus can have a machine platform implementation.

FIG. 11 illustrates that various functional units of coordinating scheduling apparatus 20 may be provided on a platform 60. The terminology "platform" is a way of describing how the functional units of coordinating scheduling apparatus 20 can be implemented or realized by machine, e.g., by electronic circuitry such a computer or circuit (e.g., ASIC), for example. The platform 60 can take any of several forms, such as (for example) a computer implementation platform or a hardware circuit platform. FIG. 11 particularly shows platform 60 as being a computer platform wherein logic and functionalities of coordinating scheduling apparatus 20 are implemented by one or more computer processors or other controllers 62 as those terms are herein expansively defined. In a computer implementation such controller(s) 62 typically function in conjunction with memory section 64. In addition to scheduling memory 42, memory section 64 may comprise random access memory 66; read only memory 68; application memory 70 (which stores, e.g., coded instructions which can be executed by the controller 62 to perform acts described herein); and any other memory such as cache memory, for example). Moreover, in conjunction with the machine platform 60 FIG. 11 shows coordinating scheduling apparatus 20 as including various interfaces, among which are keypad 71; audio input device (e.g. microphone) 72; visual input device (e.g., camera) 74; visual output device (e.g., display 76); and audio output device (e.g., speaker) 78. Other types of input/output devices can also be connected to or comprise coordinating scheduling apparatus 20.

Figure 12:
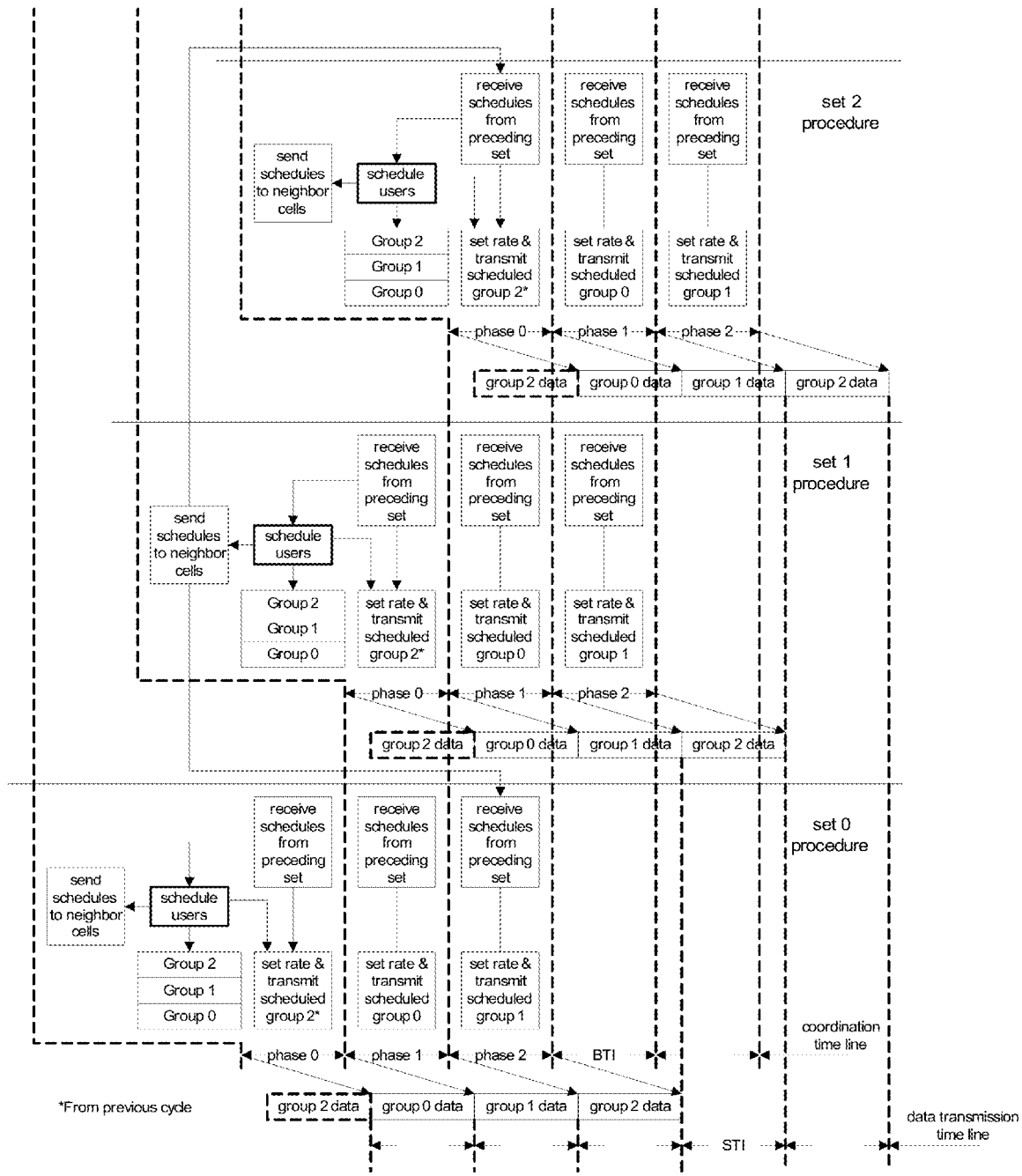
FIG. 12 is a timing diagram showing phases of operations comprising a coordinating scheduling method as performed across service areas of different sets according to example modes described herein.

In the example of FIG. 11 the platform 60 has been illustrated as computer-implemented or computer-based platforms. Another example, electronic circuit type platform suitable for coordinating scheduling apparatus 20 is that of a hardware circuit, e.g., an application specific integrated circuit (ASIC) wherein circuit elements are structured and operated to perform the various acts described herein Operation of example embodiments and modes of a network involving coordinating scheduling apparatus 20, as well as operation of example embodiments and modes of coordinating scheduling apparatus 20, are described with reference to FIG. 12. FIG. 12 is a timing diagram showing phases of operations comprising a coordinating scheduling method as performed across service areas of different sets according to example modes described herein. FIG. 12 thus serves as an aid in understanding example acts or steps of various modes and embodiments described herein and illustrated by other figures. The horizontal direction of FIG. 12 corresponds to time, increasing from left to right, which time is shown as being divided into phases, with three phases forming one cycle. FIG. 12 is vertically divided into three sections, with a lower section depicting example acts or steps involved in the phases of a set 0 procedure; a middle section depicting example acts or steps involved in the phases of a set 1 procedure; and an upper section depicting example acts or steps involved in the phases of a set 2 procedure.

Figure 13:
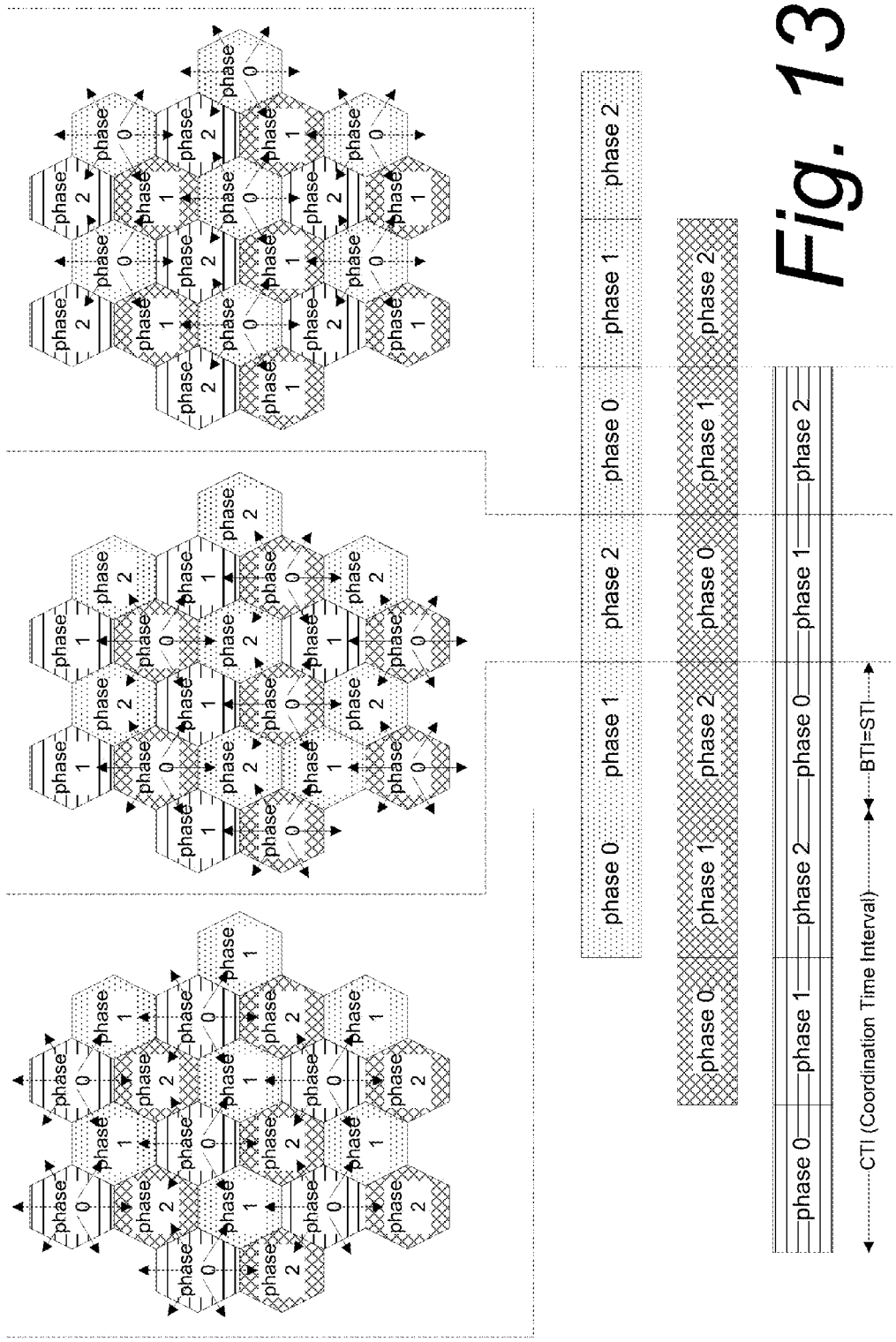
FIG. 13 is a diagrammatic view a correlation between sets of service areas that generate schedules and the phases of operation according an example embodiment and mode of a coordinating scheduling method.

FIG. 13 similarly serves as another aid in illustrating the concepts of phases and sets of service areas. FIG. 13 particularly shows a correlation between sets of service areas that generate schedules and the phases of operation according to an example embodiment and mode of the coordinating scheduling method of the technology disclosed herein. In the embodiment and mode illustrated in FIG. 13, the nodes of the service areas belonging to a set whose phase is phase 0 are the nodes which generate schedules in any given phase. Also in phase 0 the nodes of the service areas belonging to a set whose phase is phase 0 begin to transmit their schedules to other (e.g., neighbor) nodes.

In the example system shown in FIG. 13, service areas are grouped into three differently interiorly hatched sets by a reuse factor of three. It is assumed that the interference among service areas in the same set is negligible. The coordination procedure for each service set is divided into cycles of N phases where N is the reuse factor. In the non-limiting examples illustrated herein N equals 3. The phases of service areas in the same set are synchronized whereas those of the different sets are staggered so that cells in different sets are never phase synchronized. Each cycle of the coordination corresponds to a Coordination Time Interval (CTI) and each phase corresponds to a Scheduling Time Interval (STI). The scheduling time interval (STI) as used herein can be as small as the Broadcast Time Interval (BTI), which is determined by the network deployment as mentioned earlier. This greatly reduces the scheduling time and therefore makes the system more responsive and adaptive to measurement variation over time.

Figure 14:
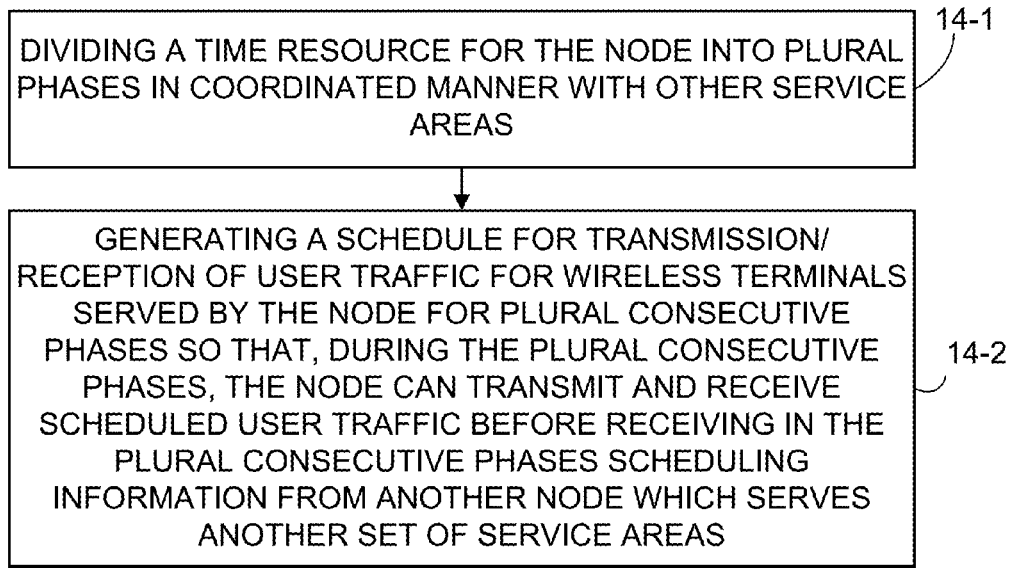
FIG. 14-FIG. 20 are flowcharts depicting example acts or steps performed in conjunction with differing example modes and embodiments of a coordinating scheduling method.

FIG. 14 illustrates generic acts or steps performed in conjunction with a basic mode of a coordinating scheduling method. As illustrated by act 14-1, the coordinating scheduling method comprises the coordinating scheduling apparatus 20 dividing a time resource for its associated node into plural phases. Such division into plural phases is performed in coordinated manner with other service areas (with a predetermined number of consecutive phases forming one cycle). The division into plural phases, and governance of operations performed during the respective phases, may be executed and/or controlled by phase controller 48 of coordinating scheduling apparatus 20.

Act 14-2 of FIG. 14 shows coordinating scheduling apparatus 20 generating a schedule for transmission/reception of user traffic for wireless terminals served by the node for plural consecutive phases. The notation "transmission/reception" and similar notation covers a situation of transmission or reception and a situation of at least one of transmission and reception. The schedule is generated so that, during the plural consecutive phases, the node can transmit and receive scheduled user traffic before receiving, in the plural consecutive phases of the same cycle, scheduling information from another node which serves another set of service areas. In an example implementation, the schedule of act 14-2 is generated by scheduler 44 of coordinating scheduling apparatus 20.

FIG. 12 shows the result of act 14-1, e.g., the coordinating scheduling apparatus 20 dividing a time resource for its associated node into plural phases. Each phase of FIG. 12 is delimited by a broken phase line that extends primarily vertically. Each phrase line cuts across three sets of procedures, e.g., the procedures for set 0 (depicted in a bottom section of FIG. 12), set 1 (depicted in a middle section of FIG. 12), and set 2 (depicted in a top section of FIG. 12). The phases are numbered as phase 0, phase 1, and phase 2, with all three such phases constituting one cycle. FIG. 12 depicts that cycles of three phases follow one another, with the result that the acts of FIG. 12 are essentially performed in pipelining fashion across the sets.

FIG. 12 thus constitutes a phase by set array, with each element of the array comprising blocks corresponding to acts or steps that are performed for a node of the respective set during a phase of operation. The acts or steps included in the elements of the array of FIG. 12 are understood by way of example in conjunction with separately described modes and embodiments of FIG. 14-19. Acts of the modes and embodiments of FIG. 14-19 may be performed combined or performed in other ways.

The lower left hand element of the matrix of FIG. 12 thus illustrates certain example acts that can be performed (e.g., by coordinating scheduling apparatus 20) during phase 0 for a node that belongs to set 0. The matrix element immediately to the right of the lower left hand element of the matrix of FIG. 12 illustrates example acts that can be performed during phase 1 for a node that belongs to set 0, and so forth. The fact that the phase line cuts across three sets of procedures reflects the fact that the time resource is divided into plural phases is performed in coordinated manner with other service areas. Moreover, in an example implementation, dividing the time resource in coordinated manner with other service areas comprises aligning service areas of a same set with same phases and staggering service areas of differing sets with offset phases, in a manner illustrated by FIG. 12.

FIG. 12 further reflects the fact that the schedule is generated so that, during the plural consecutive phases, the node can transmit and receive scheduled user traffic before receiving, in the plural consecutive phases of the same cycle, scheduling information from another node which serves another set of service areas. In this regard, during phase 0 of the lower left hand element of the matrix of FIG. 12 a schedule is generated which is effective for the following three phases, e.g., for the next ensuing phase 1, phase 2, and phase 0. The schedule generated during phase 0 of the lower left hand element of the matrix of FIG. 12 is based on scheduling information previously received from other (e.g., neighboring) nodes. The scheduling information previously received from other nodes is stored in scheduling memory 42. While the coordinating scheduling apparatus 20 for the set 0 node of the lower left hand element of the matrix of FIG. 12 can continue to receive updating or different scheduling information from other nodes during the phases following the schedule-completing phase 0, receipt of such updating or different scheduling information does not affect the schedule already developed at phase 0 for the three following phases (the three phases which follow the schedule-finalized phase 0) for set 0. Thus, unlike the prior art, latency issues involved in the receipt or processing of the updating or different scheduling information from other nodes is not a significant factor in the coordinating scheduling method of the technology disclosed herein.

Figure 15:
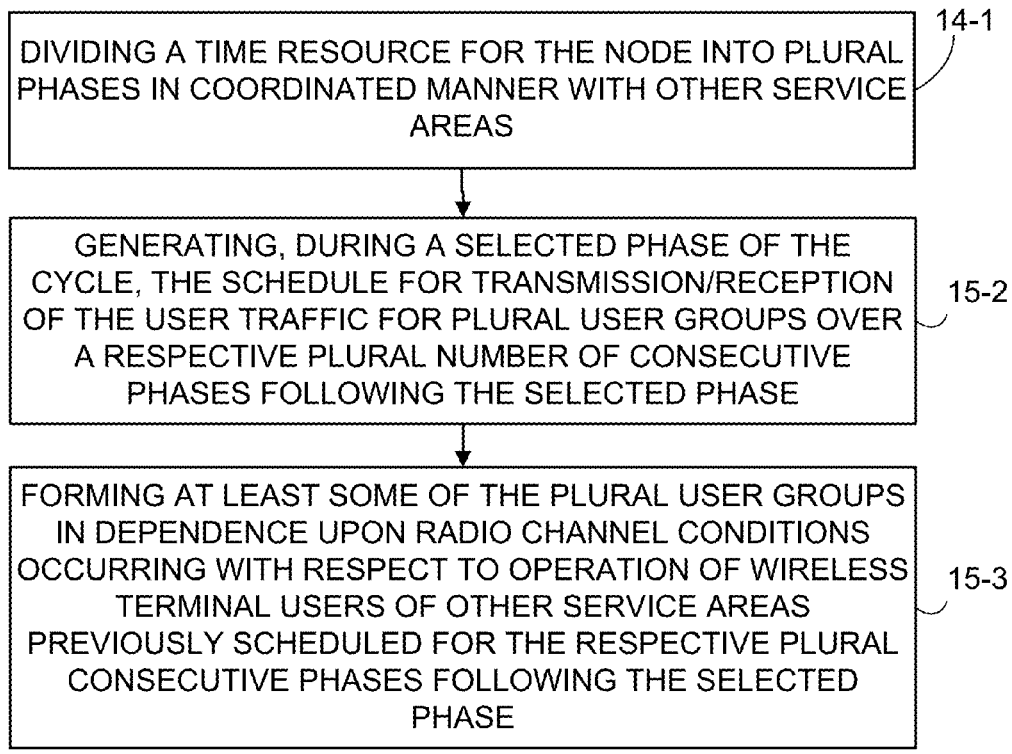

FIG. 15 illustrates another example embodiment and provides further insight for one example technique for achieving objectives of the coordinating scheduling method of the technology disclosed herein. Like the mode of FIG. 14, the mode of FIG. 15 comprises an act 14-1 of dividing a time resource for the node into plural phases in coordinated manner with other service areas. Act 15-2 comprises generating, during a selected phase of the cycle, the schedule for transmission/reception of the user traffic for plural user groups over a respective plural number of consecutive phases following the selected phase. In an example embodiment, the plural user groups comprise wireless terminals served by the node. For the example illustration reflected by FIG. 12, three such groups (e.g., group 0, group 1, and group 2) are formed for each service area, e.g., for each node. The user groups are performed by group formation unit 52 of scheduler 44. The selected phase in the illustrated example is phase 0.

Act 15-3 comprises forming at least some of the plural user groups in dependence upon radio channel conditions occurring with respect to operation of wireless terminal users of other service areas previously scheduled for the respective plural consecutive phases following the selected phase. By way of example, act 15-3 may comprise forming at least some groups so that activities of the group collectively constituted by those users will not cause unacceptable channel conditions (e.g., signal to noise/interference ratio) for already-scheduled users in service areas belong to other, already-scheduled sets. Example techniques concerning scheduling of users so as not to interference with already-scheduled users is described in U.S. patent application Ser. No. 12/491,675, entitled "Inter-Cell Interference Mitigation", which is incorporated herein by reference in its entirety, and with which the person skilled in the art understands how groups can be formed for act 15-3.

With reference to FIG. 12, it has been previously mentioned that during phase 0 of the lower left hand element of the matrix of FIG. 12 a schedule is generated which is effective for the following three phases, e.g., for the next ensuing phase 1, phase 2, and phase 0. In terms of user groups, the transmissions/receptions scheduled in phase 0 for group 0 will occur during the next following phase (i.e., phase 1); the transmissions/receptions scheduled in phase 0 for group 1 will occur during the second next following phase (i.e., phase 2); and the transmissions/receptions scheduled in phase 0 for group 2 will occur during the second next following phase (i.e., phase 0 of the next cycle).

In view of the foregoing, it will be appreciated that, in an example embodiment and mode, the user groups may be dynamically constituted for each cycle, and thus need not remain fixed or stagnant over prolonged time periods. But the user groups are formed/constituted only once per cycle, i.e., during phase 0 of the cycle, and for each node the constituency of each user group remains fixed for the three phases following scheduling (e.g., for phase 1, phase 2, and phase 0 of the next cycle).

Figure 16:
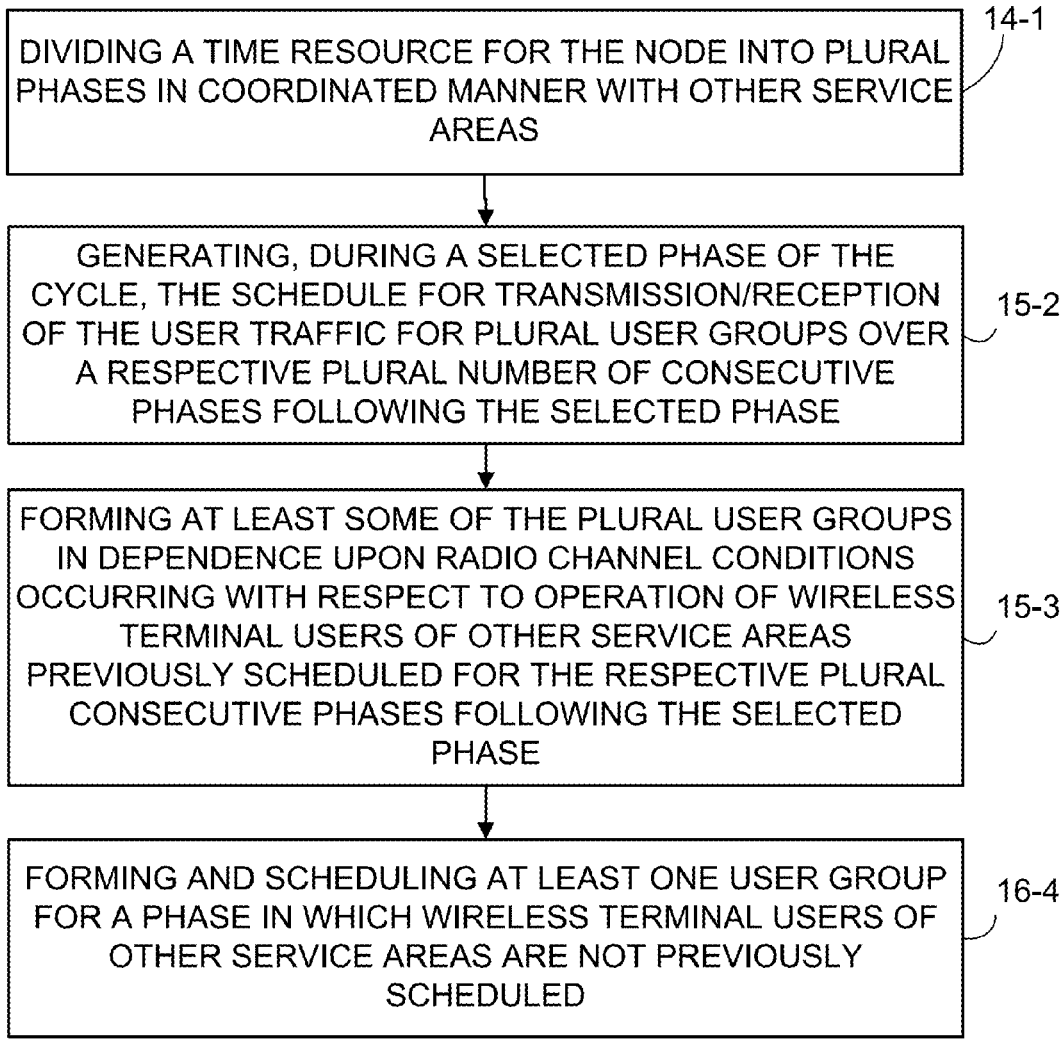

FIG. 16 illustrates a variation of the mode of FIG. 15. The mode of FIG. 16 includes acts act 14-1, 15-2, and 15-3 as previously described. But the mode of FIG. 16 differs from that of FIG. 15 by an act 16-4 of forming and scheduling at least one user group for a phase in which wireless terminal users of other service areas are not previously scheduled. Examples of the scheduling of such a "free and clear" user group are those user groups whose data is transmitted in phase 0 of any set, as those user groups were scheduled at a time when wireless terminal users of other service areas are not previously scheduled.

Figure 17:
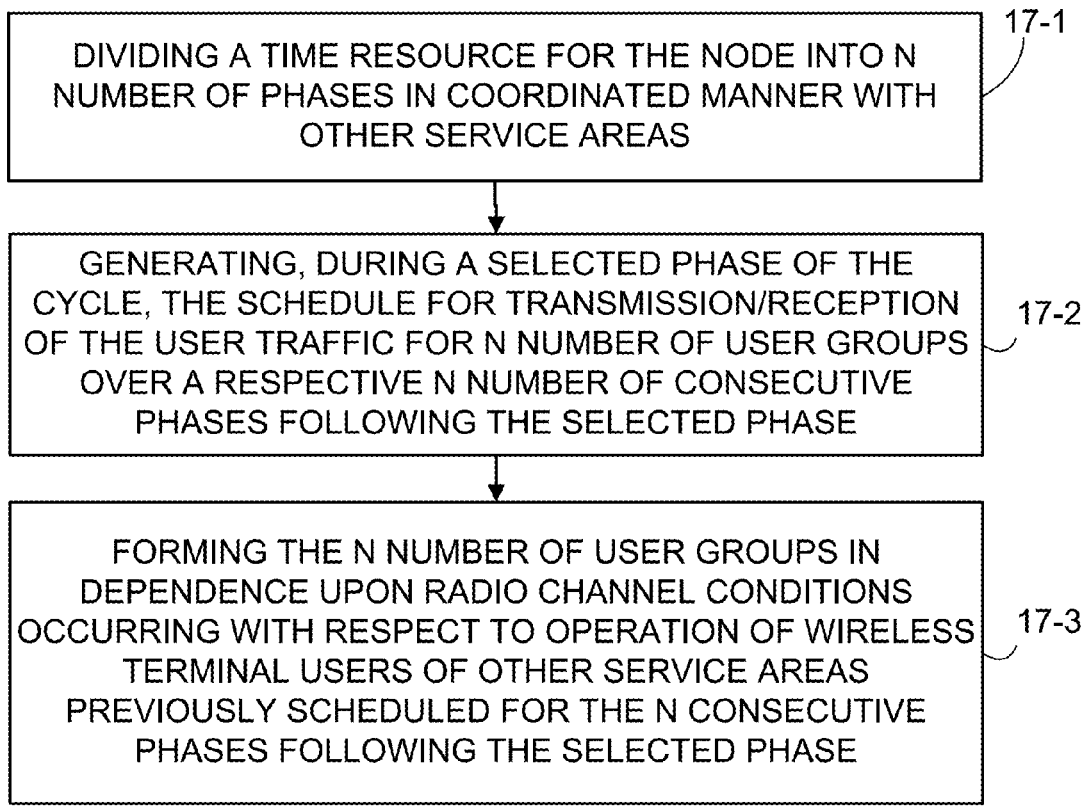

The mode of FIG. 17 resembles the mode of FIG. 15, but includes certain further specificities, e.g., specificities pertaining to number of phases and number of user groups. In particular, act 17-1 comprises dividing the time resource for the node into N number of phases in coordinated manner with other service areas. Act 17-2 comprises generating, during a selected phase of the cycle, the schedule for transmission/reception of the user traffic for N number of user groups over a respective N number of consecutive phases following the selected phase. Act 17-3 comprises forming the N number of user groups in dependence upon radio channel conditions occurring with respect to operation of wireless terminal users of other service areas previously scheduled for the N consecutive phases following the selected phase.

In describing or corresponding to FIG. 17 the matrix of FIG. 12 depicts "N" (an integer) as being three. For sake of example and simplification three phases and three user groups have been depicted in the example embodiments illustrated herein. It should be understood that the number of phases and user groups is not critical or limiting, and can be chosen in accordance with network considerations and/or operator preferences. Thus, two or more phases or user groups are encompassed hereby.

Figure 18:
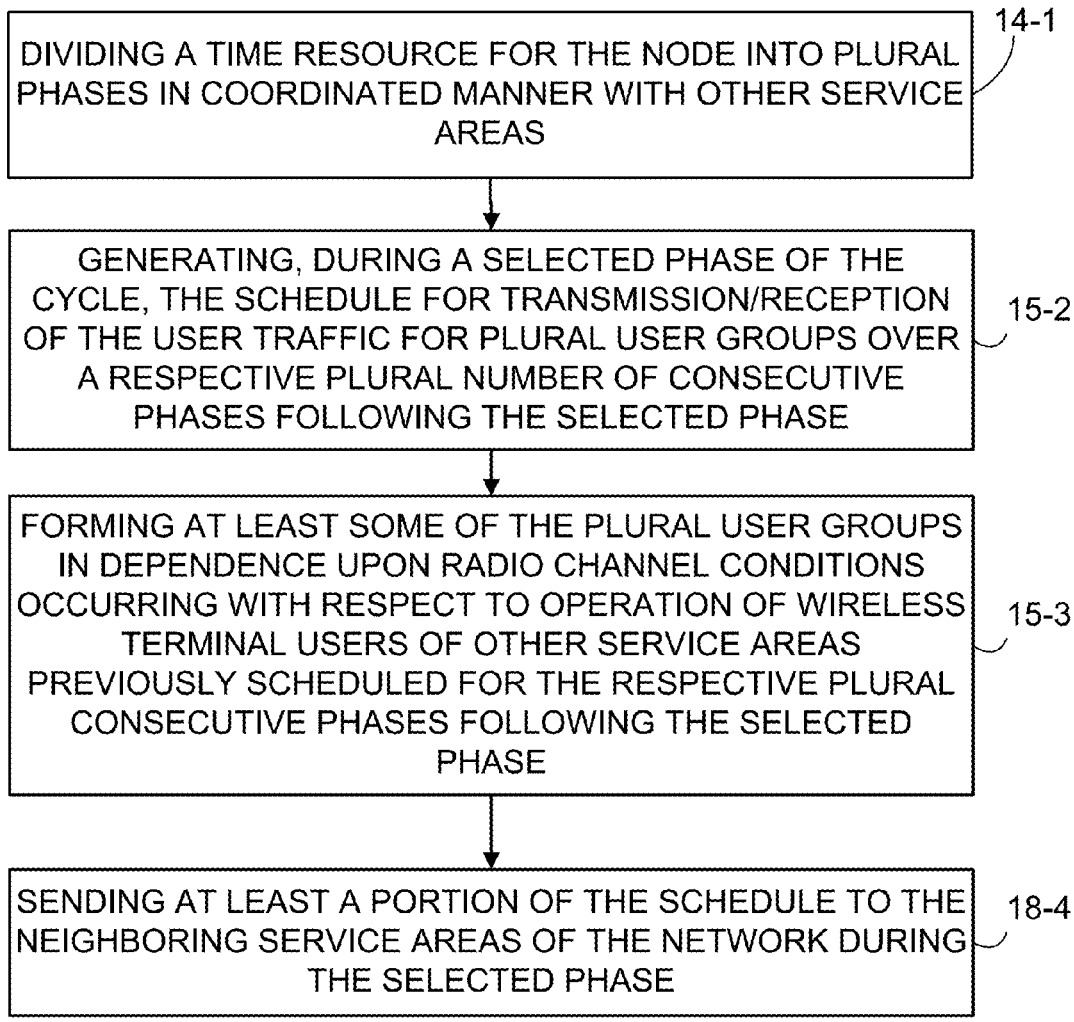

The mode of FIG. 18 resembles the mode of FIG. 15, but includes the further act of sending at least a portion of the schedule to the neighboring service areas of the network during the selected phase. The schedule is sent from scheduler 44 via communication interface 40 and over the network or inter-node interface(s) I/F previously described. The mode of FIG. 19 resembles the mode of FIG. 18, but includes the further act of (during a phase other than the selected phase) sending to the neighboring service areas any portion of the schedule that was not sent during the selected phase. Thus, as reflected by the mode of FIG. 19, the scheduler 44 need not send its entire schedule in the same phase (phase 0) in which the schedule is generated, but may distribute or spread transmission of the schedule over other phases, with earlier phases being preferred. In similar manner, the coordinating scheduling apparatus 20 need not be concerned that its schedule sent during phase 0 does not immediately reach another node, as the pipelining operation allows some grace time for a node to receive a schedule from another node before that other node's schedule is factored into scheduling.

Figure 20:
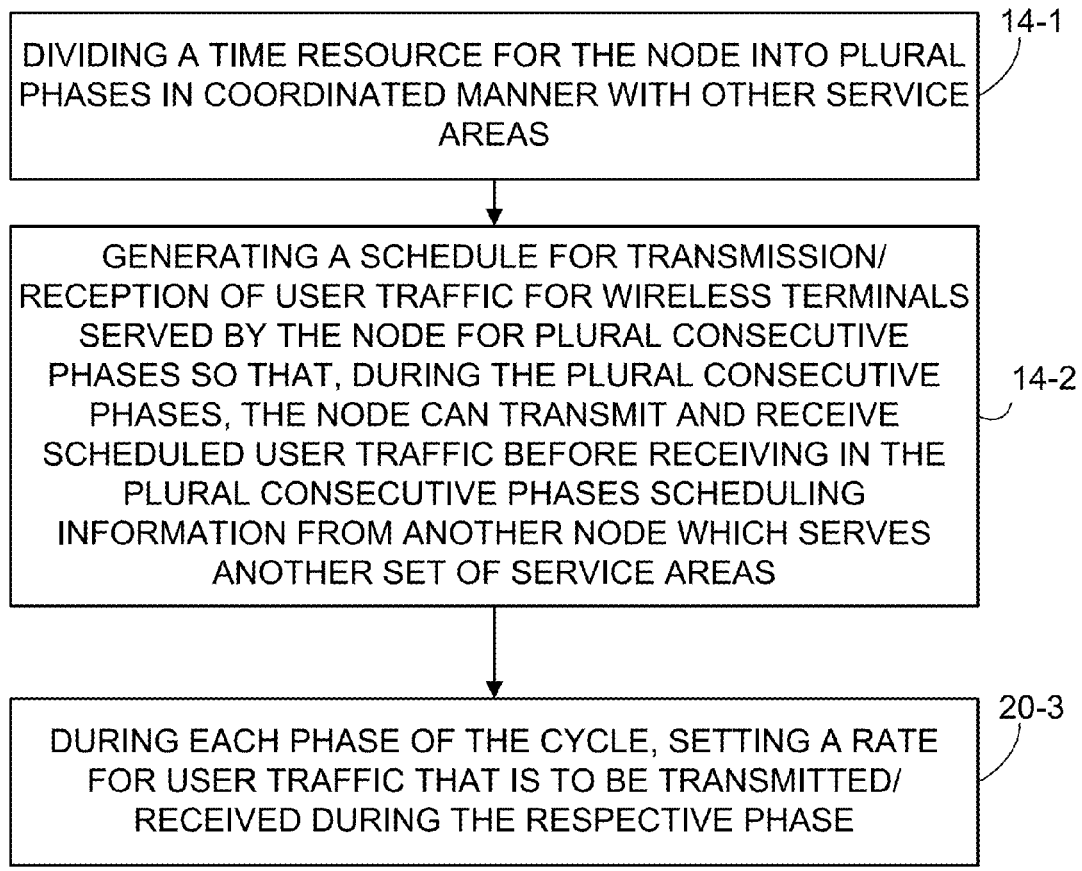

The example mode and embodiment of FIG. 20 includes acts 14-1 through 14-2 of FIG. 14, as well as further act 20-3 Act 19-4 comprises, during each phase of the cycle, setting a rate for user traffic that is to be transmitted/received during the respective phase. The rate setting of act 19-4 may be a setting of coding and/or modulation rate, and may be performed by link adaptation unit 46 of coordinating scheduling apparatus 20. The data whose rate is set in act 19-4 is the data for the group which is being transmitted in the phase for which the rate is set. In terms of FIG. 12, for example, during phase 0 of the lower left hand element of the matrix of FIG. 12 the rate is set for the group whose data is being transmitted in phase 0, i.e., group 2. In the following phase (phase 1) the rate is set for group 0, and so forth.

Figure 19:
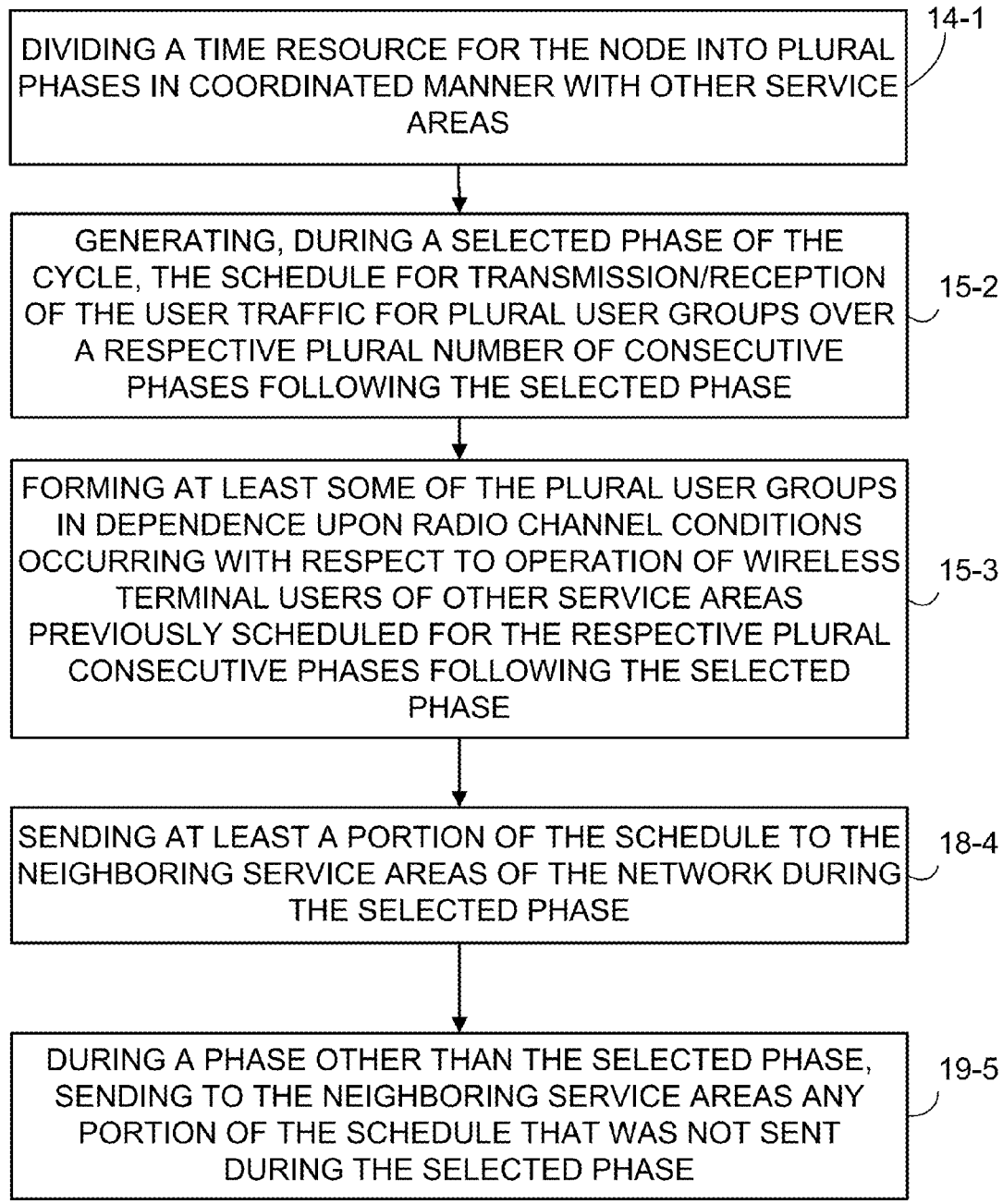

Again it will be appreciated the technology disclosed herein encompasses combining acts of various ones of the foregoing modes and embodiments with act of other embodiments and modes, e.g., combining acts, e.g., act 20-3 of FIG. 20 can be combined with the acts of FIG. 19 or the acts of FIG. 15, as just two non-limiting examples.

The technology disclosed herein thus discloses an efficient timing procedure for implementing the above-mentioned coordinating scheduling method for plural service areas and link adaptation. The technology disclosed herein may, in at least some embodiments, with refinements and modifications may employ the distributed architecture described in U.S. patent application Ser. No. 12/486,202, entitled "Network-Wide Inter-Cell Interference Minimization Via Coordinated Multipoint Cell Scheduling Coordination", which is incorporated herein by reference in its entirety.

As reflected by FIG. 12 and FIG. 13, in example embodiments and modes the technology disclosed herein divides the coordination procedure over a coordination time interval (CTI) for each service area into a number of phases, and properly arranges the relative phase offsets among cells of different sets in a way such that the scheduling time interval can be reduced by a factor equaling the number of non-interfering sets.

As mentioned above, in some of the example embodiments and modes described herein a reuse factor of three has been used as an example. The principles described herein can easily be extended to any reuse factor.

The content of the information exchange, referred to loosely in this disclosure as "scheduling information" or simply "schedules", should be interpreted broadly to encompass parameters in addition to the basic radio resource allocation of multiple users in the time-frequency plane. It may include variables such as path gains, pre-coding matrices, post processing path gains, power adjustment factors, etc., that may be time and/or frequency selective.

As also mentioned above, the Scheduling Time Interval (STI) of the technology disclosed herein can be as small as the Broadcast Time Interval (BTI), which is determined by the network deployment as mentioned earlier. This greatly reduces the scheduling time and therefore makes the system more responsive and adaptive to measurement variation over time.

FIG. 13 provides a high-level overview of the timing procedure and its correspondence with the cells' spatial distribution. Selected details of the operation in each phase of the coordination are reviewed and summarized with respect to FIG. 12:

The service areas in the system are split into three "sets".
Time is split into three "phases", 0 to 2, for each set of service areas with the phases for service areas in each set being aligned and the phases across sets being staggered as shown in FIG. 13.
Users within each service area are split into "groups", 0 to 2, with the users in groups 0 being scheduled for transmission first, the users in group 1 being scheduled for transmission next and so on.
All scheduling decisions are always made in phase 0 for each cell.

In phase 0, a service area first receives the scheduling information broadcast by neighboring service areas of different sets in the preceding BTIs (equal length as STIs). Based on this scheduling information, a service area in phase 0 can perform scheduling for users to be served in the next three STIs in a way similar to that described in U.S. patent application Ser. No. 12/486,202, entitled "Network-Wide Inter-Cell Interference Minimization Via Coordinated Multipoint Cell Scheduling Coordination", which is incorporated herein by reference in its entirety. The scheduling only occurs once in every cycle during phase 0.

Due to the staggering in phases of different sets, the users to be scheduled in the three different intervals are subject to different constraints. Referring to the procedure for set 2 in FIG. 12, users in group 0 are to be served in the next STI, during which the users in group 1 from set 1 and users in group 2 from set 0 have already been scheduled to be served. Therefore, the users in group 0 for a service area in set 2 should be selected in a way such that the interference experienced by users in group 1 from set 1 and users in group 2 from set 0 does not exceed a certain prescribed or predetermined level, such as a Signal to Interference Ratio (SIR) target. Similarly, users in group 1 of set 2 are scheduled to be served in the same STI as users in group 2 from set 1 who have already been scheduled. They should therefore be selected to avoid causing interference experienced by users in group 2 from set 1 to exceed the SIR target. Lastly, users in group 2 can be chosen without the SIR constraint since no user has been scheduled by service areas in the other 2 sets.

The selecting of users in such a way that the interference experienced by other users does not exceed a prescribed or predetermined level, such as a Signal to Interference Ratio (SIR) target, can be accomplished in various ways. Some example techniques are described in U.S. patent application Ser. No. 12/491,675, entitled "Inter-Cell Interference Mitigation", which is incorporated herein by reference in its entirety.

Once the users to be served are determined, the decision along with the scheduling information associated with each user is then broadcast to the neighboring service areas in different sets. This phase-staggered process ensures that the information required to set the rates for users to be served in the current STI is received in time. After a short processing delay (a fractional offset between the BTI and STI boundaries), the data for users in group 2 from the previous cycle can be transmitted.

In the phases 1 and 2, a service area does not perform any scheduling. It only receives the scheduling information broadcast in the preceding BTIs by the neighboring service areas in different sets. Based on the received information, a service area can then determine the data rates for the users to be served in the current STI and subsequently transmit it after a short processing delay. During these phases, a service area may continue broadcasting (not shown in FIG. 12) the scheduling information that has not yet been delivered to the neighboring cells. It may also choose to pass the most up-to-date scheduling information (including path gains, etc.) so that rate setting (link adaptation) is more accurate for the next BTI.

Thus, in accordance with various embodiments and modes, the coordinating scheduling methods of the technology disclosed herein encompass the following:

1. Group service areas in the network are divided into N non-interfering sets of service areas by a reuse factor of N.
2. Coordination process are divided into N phases, numbered 0, 1, ..., N−1. The process repeats in an N-phase cycle.
   2a. Each phase has the same interval which is equal to a STI but is no less than the BTI.
   2b. Service areas in the same non-interfering set are phase synchronized.
   2c. Each set has a unique phase offset.
3. There is a process for each phase:
   3a. The process for Phase 0:
      i. receive scheduling information from neighboring service areas sent in preceding frame(s)
      ii. schedule users for upcoming N number of STIs based on available information.
      iii. send all or part of scheduling information to neighboring service areas.
      iv. set rates for user data to be transmitted in current STI based on available information.
   3b. The process for phase n>0:
      i. receive scheduling information from neighboring service areas broadcast in preceding BTI(s)
      ii. broadcast all or part of remaining scheduling information to neighboring service areas of different sets
      iii. set rates for user data to be transmitted in current BTI based on available information The technology describe herein afford many advantages. Some representative advantages are as follows:
   Reduction in coordination time in distributed coordinated scheduling.
   Reduction in the scheduling time interval.
   Relaxation of requirement for latency between coordinating cells.
   Reduction of delay between channel quality measurement and link adaptation.

In the prior communication latency between service areas can be high, which undesirably slows down the ability to schedule. The technology disclosed herein advantageously provides a pipelining coordinating scheduling method (as illustrated in FIG. 12) by which the scheduling can be accomplished quickly even with higher latency in communication. By the pipelined operation provided hereby, the system can ensure that all service areas are transmitting all the time while scheduling information is still being received before actual transmission of the scheduled user traffic.

Although the description above contains many specificities, these should not be construed as limiting the scope of the invention but as merely providing illustrations of some of the presently preferred embodiments of this invention. Thus the scope of this invention should be determined by the appended claims and their legal equivalents. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A method of scheduling wireless communication associated with a telecommunications node, the node serving a service area that belongs to one set of plural sets of service areas, the method comprising:
   dividing a time resource for the node into plural phases in coordinated manner with other service areas, with a predetermined number of consecutive phases forming one cycle;
   during a selected phase of the cycle, generating a schedule for transmission or reception of user traffic for plural user groups served by the node over a respective plural number of consecutive phase following the selected phase, the plural user groups comprising wireless terminals serve by the node;
   sending at least a portion of the schedule to one or more service areas neighboring a service area served by the node during the selected phase; and
   during the plural consecutive phases transmitting or receiving scheduled user traffic before receiving in the plural consecutive phases scheduling information from another node which serves another set of service areas.

2. The method of claim 1, further comprising:
forming at least some of the plural user groups in dependence upon radio channel conditions occurring with respect to operation of wireless terminal users of other service areas previously scheduled for the respective plural consecutive phases following the selected phase.

3. The method of claim 2, further comprising forming and scheduling at least one user group for a phase in which wireless terminal users of other service areas are not previously scheduled.

4. The method of claim 2, wherein the node serves the service area which belongs to one set of N number of sets of service areas comprising the network, and wherein the method further comprising:
dividing the time resource for the node into N number of phases;
forming N number of user groups; and
during the selected phase of the cycle, generating the schedule for transmission or reception of the user traffic for the N user groups over a respective N number of consecutive phases following the selected phase.

5. The method of claim 1, further comprising, during a phase other than the selected phase, sending to the one or more service areas neighboring a service area served by the node any portion of the schedule that was not sent during the selected phase.

6. The method of claim 2, further comprising forming the plural groups during the selected phase of the cycle, the plural groups thereby being defined for duration of the plural consecutive phases following the selected phase.

7. The method of claim 1, further comprising, during each phase of the cycle, the node receiving scheduling information previously sent from one or more service areas neighboring a service area served by the node.

8. The method of claim 1, wherein dividing the time resource in coordinated manner with other service areas further comprises aligning service areas of a same set with same phases and staggering service areas of differing sets with offset phases.

9. The method of claim 2, wherein the selected phase is a first phase of the plural consecutive phases.

10. The method of claim 1, further comprising, during each phase of the cycle, setting a rate for user traffic that is to be transmitted or received during the respective phase.

11. The method of claim 1, wherein the node comprises a base station node and the service area comprises a cell served by the base station.

12. The method of claim 1, wherein the node comprises a radio network controller node and the service area comprises a group of cells served by the radio network controller node.

13. The method of claim 1, wherein the node comprises a portion of a radio base station node and the service area comprises a sector served by the radio base station node.

14. An apparatus associated with a node of a radio access network, the node serving a service area which belongs to one set of plural sets of service areas comprising the network, the apparatus comprising electronic circuitry configured to:
divide a time resource for the node into plural phases in coordinated manner with other service areas, with a predetermined number of consecutive phases forming one cycle;
during a selected phase of the cycle, generate a schedule for transmission or reception of user traffic for plural user groups served by the node over a respective plural number of consecutive phase following the selected phase, the plural user groups comprising wireless terminals served by the node;
send at least a portion of the schedule to one or more service areas neighboring a service area served by the node during the selected phase; and
during the plural consecutive phases, transmit or receive scheduled user traffic before receiving in the plural consecutive phases scheduling information from another node which serves another set of service areas.

15. The apparatus of claim 14, wherein the electronic circuitry is further configured to
form at least some of the plural user groups in dependence upon radio channel conditions occurring with respect to operation of wireless terminal users of other service areas previously scheduled for the respective plural consecutive phases following the selected phase.

16. The apparatus of claim 14, wherein the communications interface is configured, during a phase other than the selected phase, to send to one or more service areas neighboring a service area served by the node any portion of the schedule that was not sent during the selected phase.

17. The apparatus of claim 15, wherein the electronic circuitry is further configured to form and schedule at least one user group for a phase in which wireless terminal users of other service areas are not previously scheduled.

18. The apparatus of claim 15, wherein the node serves the service area which belongs to one set of N number of sets of service areas comprising the network, and wherein the electronic circuitry is configured to:
divide the time resource for the node into N number of phases;
form N number of user groups; and
during the selected phase of the cycle, generate the schedule for transmission or reception of the user traffic for the N user groups over a respective N number of consecutive phases following the selected phase.

19. The apparatus of claim 15, wherein the electronic circuitry is further configured to form the plural groups during the selected phase of the cycle, the plural groups thereby being defined for duration of the plural consecutive phases following the selected phase.

20. The apparatus of claim 15, wherein the node comprises a first node, and wherein the electronic circuitry is further configured, during each phase of the cycle, to receive scheduling information previously sent by a second node serving a service area neighboring a service area served by the first node.

21. The apparatus of claim 15, wherein the electronic circuitry is further configured to divide the time resource in coordinated manner with other service areas by aligning service areas of a same set with same phases and by staggering service areas of differing sets with offset phases.

22. The apparatus of claim 15, wherein the selected phase is a first phase of the plural consecutive phases.

23. The apparatus of claim 14, wherein the electronic circuitry is further configured, during each phase of the cycle, to set a rate for user traffic that is to be transmitted/received during the respective phase.

24. The apparatus of claim 14, wherein the node is a base station node and the service area is a cell served by the base station.

25. The apparatus of claim 14, wherein the node is a radio network controller node and the service area is a group of cells served by the radio network controller node.

26. The apparatus of claim 15, wherein the node is a portion of a radio base station node and the service area is a sector served by the radio base station node.

27. A method of operating a communications network comprising plural nodes, each node serving a service area which belongs to one set of plural sets of service areas comprising the network, the method comprising:
- in coordinated manner dividing a time resource for the plural nodes into plural phases, with a predetermined number of consecutive phases forming one cycle, with cycles of differing sets beginning with differing phases;
- for each of the plural nodes during a selected phase of the cycle selected separately for each of the plural nodes, generating a schedule for transmission or reception of user traffic for the plural user groups served by the node over a respective plural number of consecutive phases following the selected phase, the plural user groups comprising wireless terminals served by the node;
- from each of the plural nodes, sending at least a portion of the schedule to one or more service areas neighboring a service area served by the node during the selected phase; and
- each of the plural nodes transmitting or receiving scheduled user traffic before receiving in the plural consecutive phases scheduling information from a node which serves another set of service areas.

28. The method of claim 27, further comprising:
- each of the plural nodes performing the scheduling of the transmission or reception of user traffic in a first phase of the cycle; and
- each of the plural nodes prospectively scheduling the transmission or reception of user traffic for plural phases following the first phase of the cycle.

29. The method of claim 27, wherein each node serves a respective service area which belongs to one set of N number of sets of service areas comprising the network, and wherein the method further comprises:
- dividing the time resource for the node into N number of phases; and,
- during the selected phase of the cycle, generating the schedule for transmission or reception of the user traffic over a respective N number of consecutive phases following the selected phase.

* * * * *

UNITED STATES PATENT AND TRADEMARK OFFICE
CERTIFICATE OF CORRECTION

PATENT NO. : 8,554,235 B2  
APPLICATION NO. : 12/944204  
DATED : October 8, 2013  
INVENTOR(S) : Guey et al.

Page 1 of 1

It is certified that error appears in the above-identified patent and that said Letters Patent is hereby corrected as shown below:

On the Title Page, in Item (73), under "Assignee", in Column 1, Line 1, delete "Ericcson" and insert -- Ericsson --, therefor.

In the Claims:

In Column 18, Line 60, in Claim 1, delete "phase" and insert -- phases --, therefor.

In Column 18, Line 62, in Claim 1, delete "serve" and insert -- served --, therefor.

In Column 20, Line 1, in Claim 14, delete "phase" and insert -- phases --, therefor.

In Column 21, Line 15, in Claim 27, delete "for the" and insert -- for --, therefor.

Signed and Sealed this
Eleventh Day of February, 2014

Michelle K. Lee
*Deputy Director of the United States Patent and Trademark Office*